United States Patent [19]
Tanaka et al.

[11] Patent Number: 5,698,852
[45] Date of Patent: Dec. 16, 1997

[54] TITANIUM BOLOMETER-TYPE INFRARED DETECTING APPARATUS

[75] Inventors: Akio Tanaka; Nobukazu Teranishi, both of Tokyo, Japan

[73] Assignee: NEC Corporation, Tokyo, Japan

[21] Appl. No.: 514,256

[22] Filed: Aug. 11, 1995

[30] Foreign Application Priority Data

| Aug. 11, 1994 | [JP] | Japan | 6-189144 |
| Mar. 31, 1995 | [JP] | Japan | 7-075264 |

[51] Int. Cl.$^6$ ................................................ H01L 31/08
[52] U.S. Cl. ............... 250/332; 250/338.4; 348/294; 348/308
[58] Field of Search ............... 250/332, 338.4, 250/370.14, 370.15; 348/294, 301, 308, 320

[56] References Cited

U.S. PATENT DOCUMENTS

| 3,676,754 | 7/1972 | Maserjian et al. | 317/230 |
| 4,395,736 | 7/1983 | Fraleux | 348/308 |
| 4,587,426 | 5/1986 | Munier et al. | 250/338 |
| 4,745,278 | 5/1988 | Hanson | 250/338.4 |
| 4,808,822 | 2/1989 | Manning et al. | 250/332 |
| 4,967,082 | 10/1990 | Cooke et al. | 250/332 |
| 4,994,877 | 2/1991 | Ino et al. | 348/294 |
| 5,021,663 | 6/1991 | Hornbeck | 250/349 |
| 5,134,488 | 7/1992 | Sauer | 250/332 |
| 5,196,703 | 3/1993 | Keenan | 250/332 |
| 5,200,623 | 4/1993 | Cannata | 250/332 |
| 5,286,976 | 2/1994 | Cole | 250/349 |
| 5,288,649 | 2/1994 | Keenan | 437/3 |
| 5,324,944 | 6/1994 | Soch et al. | 250/332 |
| 5,367,167 | 11/1994 | Keenan | 250/338.4 |
| 5,367,754 | 11/1994 | Keenan | 250/338.4 |
| 5,399,897 | 3/1995 | Cunningham et al. | 257/467 |

FOREIGN PATENT DOCUMENTS

| 2-196929 | 8/1990 | Japan . |
| 4-333292 | 11/1992 | Japan . |
| 5-206526 | 8/1993 | Japan . |

OTHER PUBLICATIONS

Johnson et al., "Silicon Microstructure Superconducting Microbolometer Infrared Arrays", SPIE, vol. 2020 Infrared Technology XIX, pp. 2–11 (1993).

R.A. Wood, "High–Performance Infrared Thermal Imaging with Monolithic Silicon Focal Planes Operating at Room Temperature", IEDM 93–175, pp. 8.1.1–8.1.3., 1993.

*Primary Examiner*—Constantine Hannaher
*Assistant Examiner*—Virgil O. Tyler
*Attorney, Agent, or Firm*—Foley & Lardner

[57] ABSTRACT

In a bolometer-type infrared detecting apparatus, a bolometer and a MOS transistor are provided for one pixel. A source of the MOS transistor is connected to a power supply terminal. A drain of the MOS transistor is connected to the bolometer which is connected via a switch to an output terminal.

55 Claims, 26 Drawing Sheets

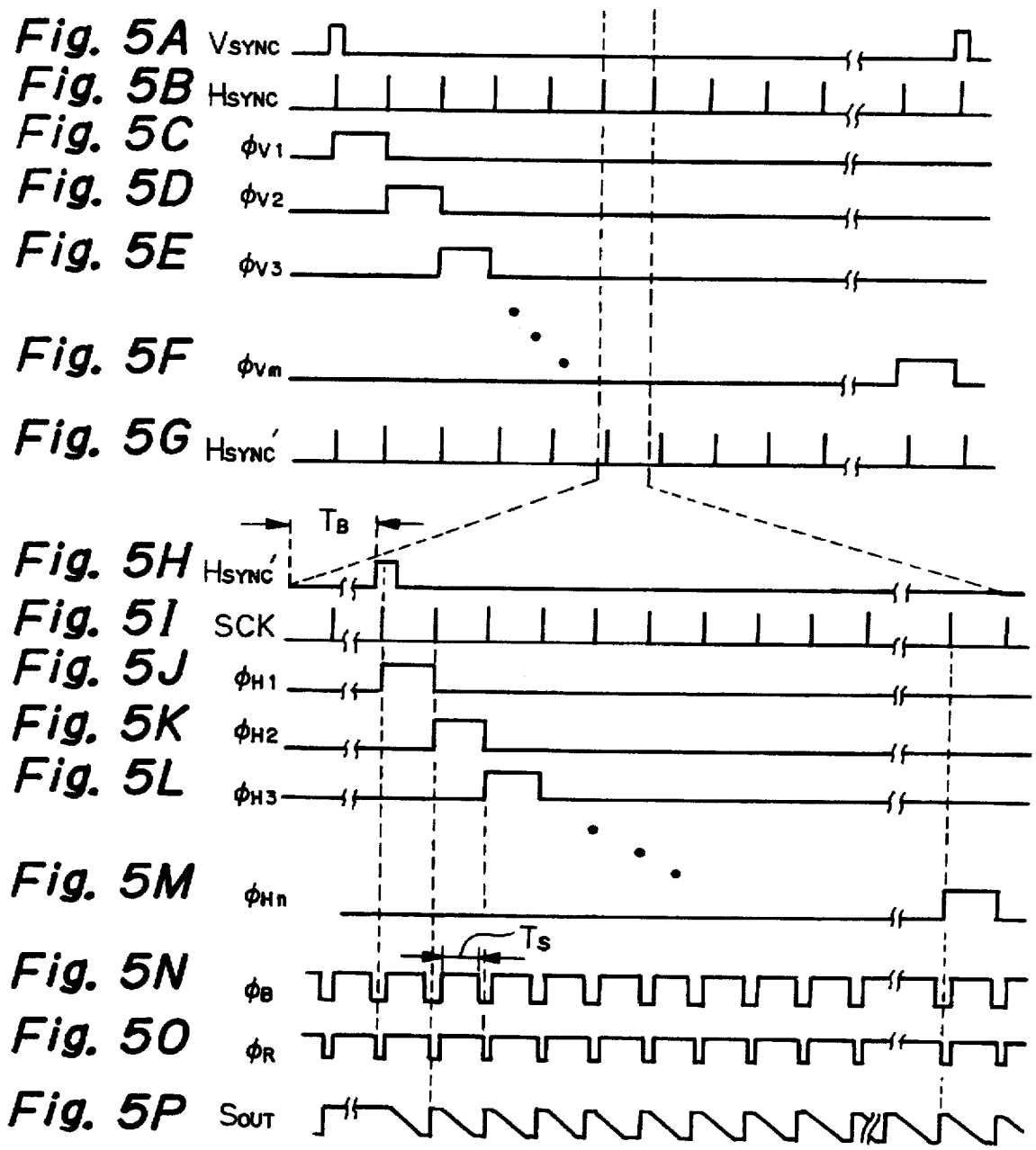

FROM HORIZONTAL SHIFT REGISTER 3

Fig. 16A H_SYNC 
Fig. 16B SCK 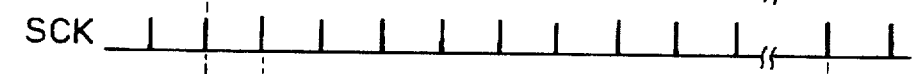
Fig. 16C φ_H1 
Fig. 16D φ_H2 
Fig. 16E φ_H3 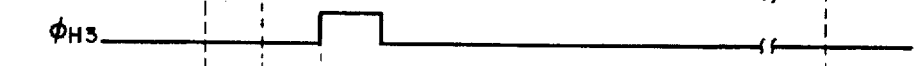
Fig. 16F φ_Hn 
Fig. 16G φ_B 
Fig. 16H φ_R 
Fig. 16I S_OUT 

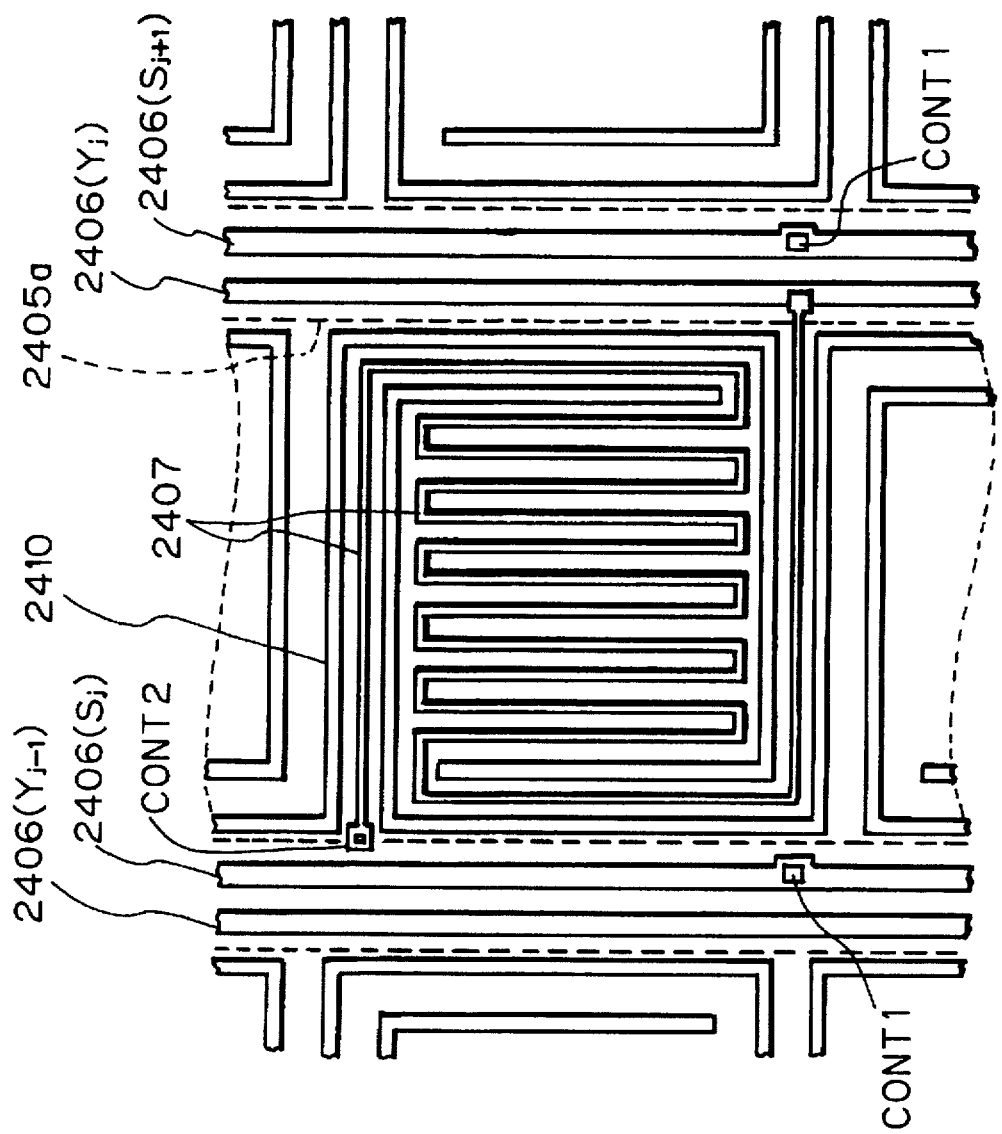

TITANIUM BOLOMETER-TYPE INFRARED DETECTING APPARATUS

BACKGROUND OF THE INVENTION

1. Field of the Invention

The present invention relates to a bolometer-type infrared detecting apparatus with low 1/f noise.

2. Description of the Related Art

Generally, infrared detecting apparatuses are broadly used in crime prevention systems, supervisory systems, guiding systems, medical systems, instrumental measurement systems, and the like. Infrared detecting apparatuses are divided into a photon detector type and a thermal detector type. The photon detector type requires a cooling apparatus thus increasing the manufacturing cost. On the other hand, the thermal detector type does not require such a cooling aparatus, thus decreasing the manufacturing cost.

A prior art infrared detecting apparatus of the thermal detector type includes thermopiles (see: JP-A-4-333292).

In the above-described prior art thermopile-type infrared detecting apparatus, however, since the thermoelectromotive force of a thermopile is very small, a signal to noise (S/N) ratio cannot be decreased even if the bandwidth of noise is narrowed to eliminate such noise.

Another prior art infrared detecting apparatus of the thermal detector type includes a bolometer formed on a diaphragm and a bipolar transistor connected to the bolometer (see: Burgess R. Johnson et al., "Silicon Microstructure Superconducting Microbolometer Infrared Technology XIX, pp. 2–11, 1993). This will be also explained later in detail.

In the prior art bolometer-type infrared detecting apparatus, however, since a bipolar transistor is used, the power consumption is increased.

Also, metal such as platinum, nickel or gold, thermistors, semiconductors, superconductive materials and dielectric materials have been used for the bolometer. However, platinum, nickel and gold have a small resistance change per unit temperature. Also, since platinum, nickel and gold have a large thermal conductivity, it is insufficient to thermally isolate them, thus reducing the sensitivity. Further, although thermistors and semiconductors have a large resistance change/deg., the 1/f noise is increased as the current is increased. Still further, since thermistors and semiconductors have a large specific resistance, the thermal noise is increased. Further, superconductive materials require a cooling apparatus. Still further, dielectric materials have a large specific resistance, thus increasing the thermal noise. Also, with respect to vanadium oxide, use is made of silicon manufacturing process. Therefore, any of platinum, nickel, gold, thermistors, semiconauctors, superconductive materials and dielectic materials are not preferable for the bolometer.

SUMMARY OF THE INVENTION

It is an object of the present invention to provide an infrared detecting apparatus with low 1/f noise and low power consumption.

According to the present invention, in a bolometer-type infrared detecting apparatus, a bolometer and a MOS transistor are provided for one pixel. A source of the MOS transistor is connected to a power supply terminal. A drain of the MOS transistor is connected to the bolometer which is connected to an output terminal. Since the MOB transistor is used instead of a bipolar transistor, the power consumption can be reduced.

Also, since the source of the MOB transistor is connected to the power supply terminal, the ON resistance of the MOS transistor is reduced. Note that the voltage at the source is increased, the ON resistance of the MOS transistor is increased due to the body effect. Also, since the ON resistance of the MOS transistor is reduced and the bolometer is made of titanium or its alloy, the 1/f noise can be reduced. That is, the 1/f noise is a fluctuation of resistance, and therefore, if the resistance of the bolometer is predominent, the 1/f noise of the MOS transistor is hardly observed. Note that the 1/f noise of MOS transistors is generally large.

BRIEF DESCRIPTION OF THE DRAWINGS

The present invention will be more clearly understood from the description as set forth below, as compared with the prior art, with reference to the accompanying drawings, wherein:

FIGS. 5A through 5P are timing diagrams for showing the operation of the appratus of FIG. 3;

FIGS. 16A through 16I are timing diagrams for showing the operation of the apparatus of FIG. 15;

FIGS. 25A and 25B are plan views of the apparatus of FIGS. 24; and

DESCRIPTION OF THE PREFERRED EMBODIMENTS

Before the description of the preferred embodiments, prior art thermal detector type infrared detecting apparatuses will be explained with reference to FIGS. 1, 2A and 2B.

Figure 1:
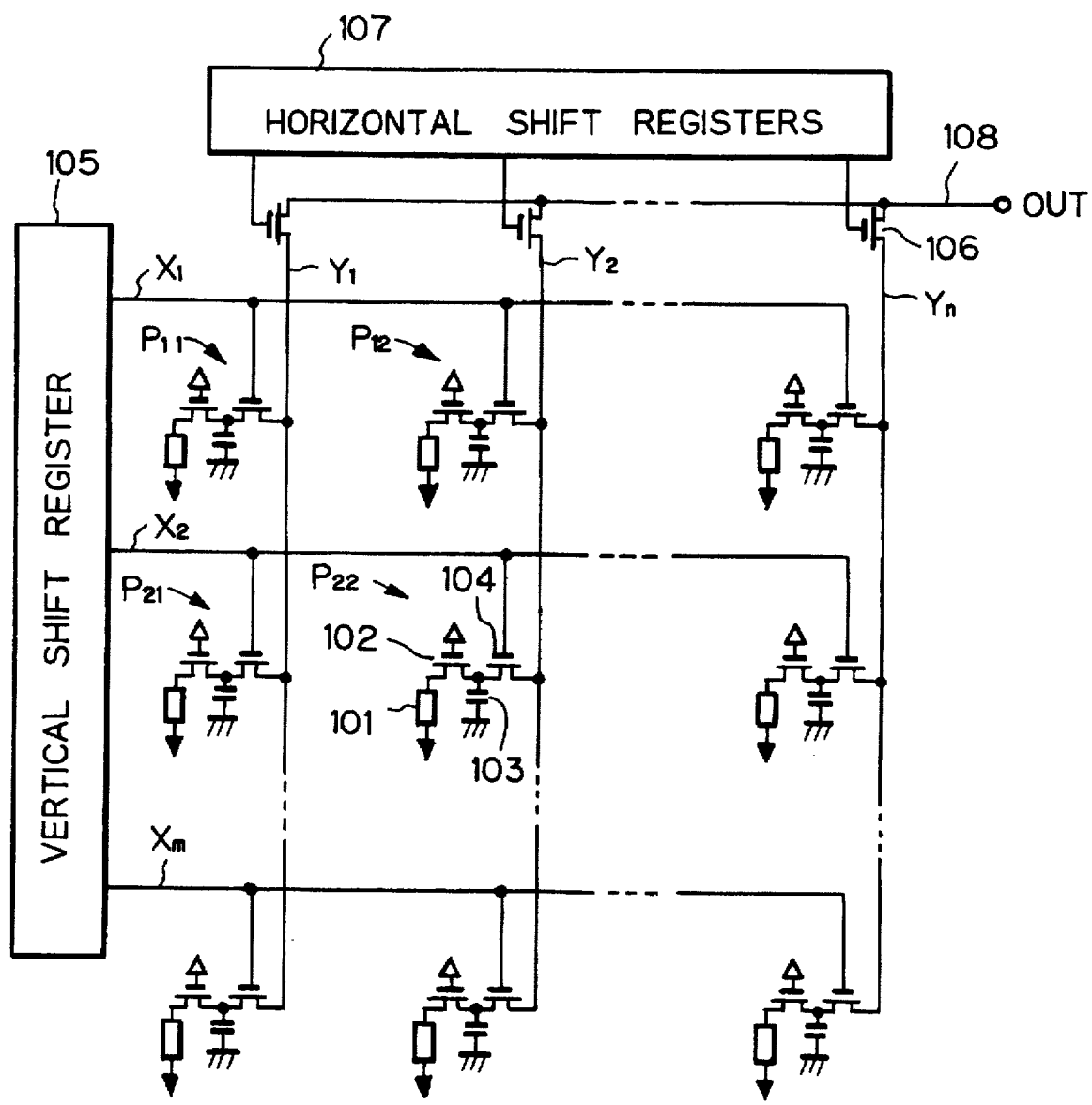
FIG. 1 is a circuit diagram illustrating a thermopile-type infrared detecting apparatus.

In FIG. 1, which illustrates a prior art two-dimensional thermopile-type infrared detecting apparatus (see: JP-A-4-333292), one pixel $P_{ij}$ (i=1, 2, ..., m, j=1, 2, ..., n) is provided at each intersection between signal lines $X_1$, $X_2$, ..., $X_m$ and signal lines $Y_1$, $Y_2$, ..., $Y_n$. The pixel $P_{ij}$ is constructed by a thermopile 101, a MOS transistor 102, a capacitor 103 and a vertical switch 104. The signal lines $X_1$, $X_2$, ..., $X_m$ are sequentially selected by a vertical shift register 105, and the signal lines $Y_1$, $Y_2$, ..., $Y_n$ are sequentially selected via switches 106 by a horizontal shift register 107. As a result, data of a selected pixel is output via an output line 108 to an output terminal OUT.

The thermopile 101 is constructed by a hot contact formed on a thermal isolation structure or so-called diaphragm and a cold contact formed on a substrate. When infrared is incident to the apparatus, the temperature at the diaphragm is increased to generate a difference in temperature between the hot contact and the cold contact, thus creating a thermoelectromotive force in the thermopile. In this case, if an object for radiating infrared has a difference of 1 degree, an increase of the temperature of the diaphragm is a very slight value such as 0.002 deg. Therefore, the thermoelectromotive force of the thermopile modifies a bias current flowing through the MOS transistor 102, so that charges by such a bias current are stored in the capacitor 103. The charges are read by turning ON one of the switches 104 and one of the switches 106 to the output terminal OUT. Note that, in order to reduce the noise, one capacitor 103 is provided for each pixel to increase an integration time period.

In the thermopile-type infrared detecting apparatus of FIG. 1, however, as stated above, since the thermoelectromotive force of each thermopile is very small, the S/N ratio cannot be reduced even if the bandwidth of noise is narrowed.

Figure 2A:
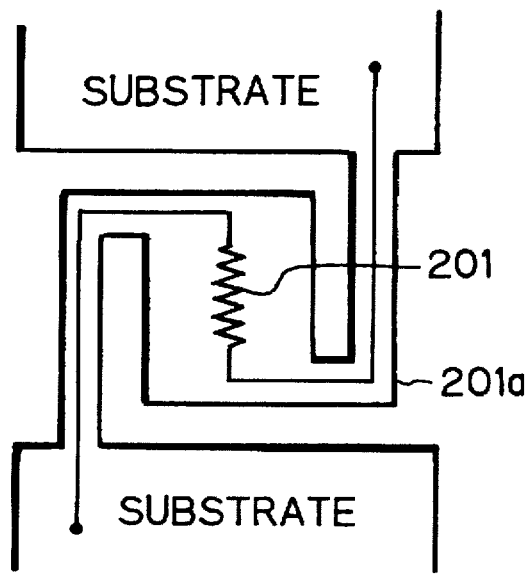
FIG. 2A is a diagram illustrating a prior art bolometer-type infrared detecting apparatus.
Figure 2B:
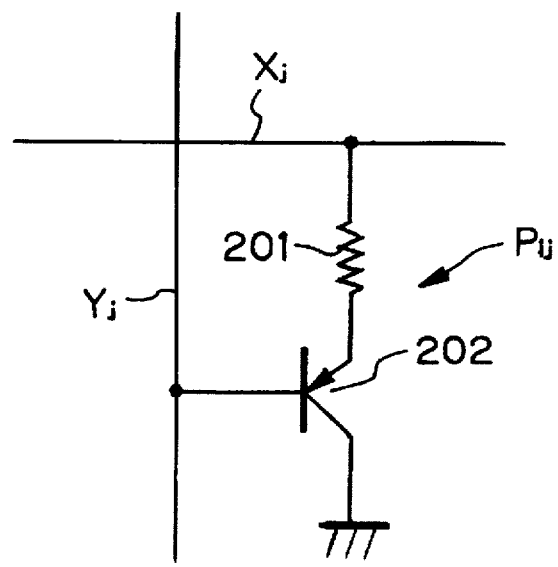
FIG. 2B is a circuit diagram of the apparatus of FIG. 2A.

In FIGS. 2A and 2B, which illustrate a prior art bolemeter-type infrared detecting apparatus (see the Burgess R. Johnson document), a pixel $P_{ij}$ is constructed by a bolometer 201 formed on a diaphragm 201a and a bipolar transistor 202. The pixel $P_{ij}$ a is located at an intersection between a signal line $X_i$ and a signal line $Y_j$. In the apparatus of FIGS. 2A and 2B, a capacitor as indicated by 103 in FIG. 1 is not provided, and therefore, the bandwidth of noise is increased. However, a signal voltage $V_s$ is represented by $$V_s = I \cdot \alpha \cdot \Delta T$$

where I is a bias current;

α is a temperature coefficient of the bolometer 201; and

ΔT is an increase in temperature of the diaphragm 201a.

Therefore, if the bias current I is increased, the signal voltage $V_s$ can be increased.

In the bolometer-type infrared detecting apparatus of FIGS. 2A and 2B however, although the ON resistance of the bipolar transistor can be decreased, bipolar transistors are provided in a vertical shift register, a horizontal shift register, and the like, which increases the power consumption, since bipolar transistors per se require a large power consumption. Also, the large power consumption raises the temperature of the diaphragm, thus causing the output voltage to drift. This is fatal particularly in a highly integrated bolometer-type infrared detecting apparatus.

Figure 3:
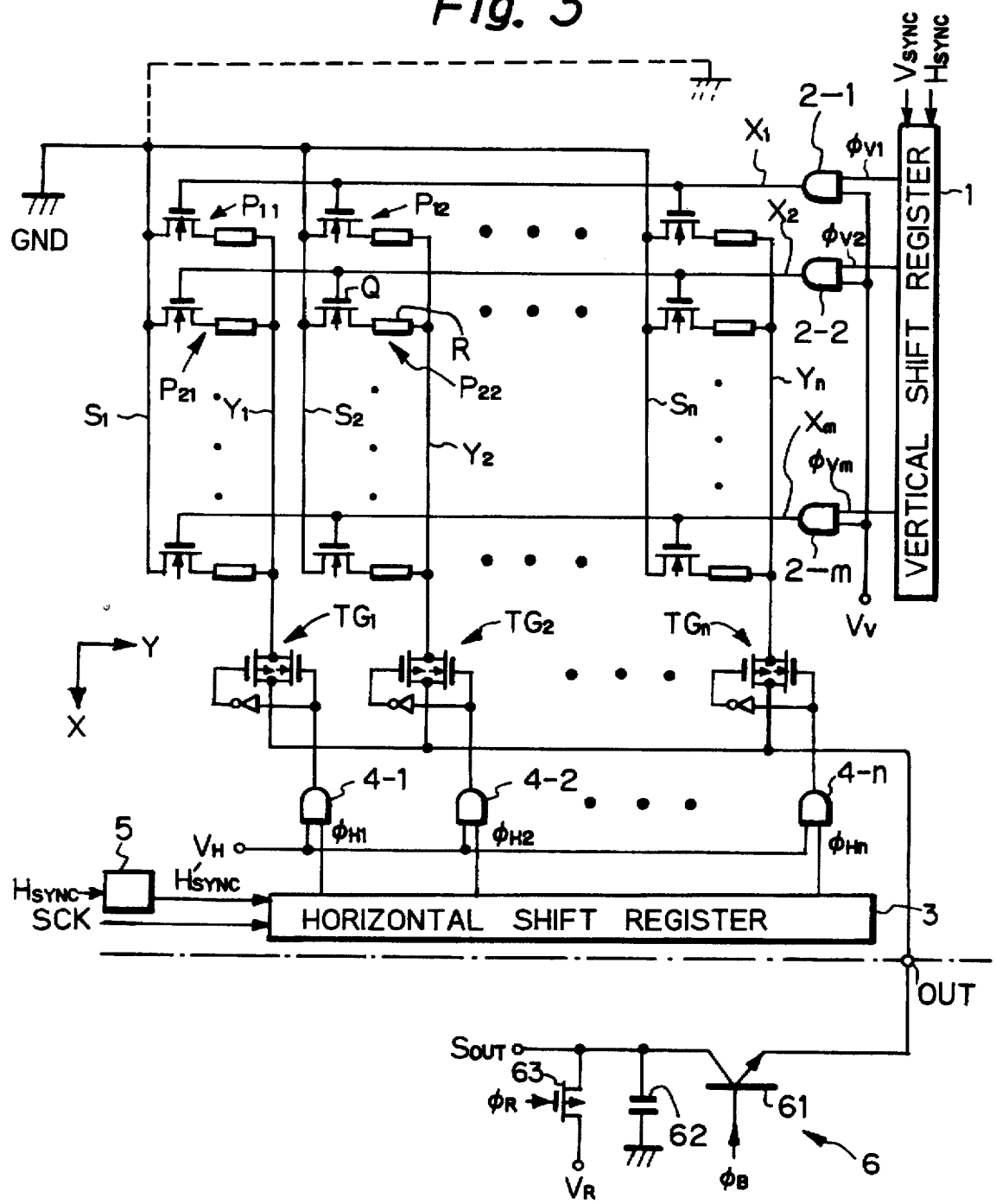
FIG. 3 is a circuit diagram illustrating a first embodiment of the bolometer-type infrared detecting apparatus.

In FIG. 3, which illustrates a first embodiment of the present invention, a two-dimensional bolometer-type infrared detecting apparatus is illustrated. That is, signal lines $X_1$, $X_2$, ..., $X_n$ are arranged in parallel along an X direction, while signal lines $Y_1$, $Y_2$, $Y_n$ and source lines $S_1$, $S_2$, ..., $S_n$ are arranged in parallel along a Y direction. The source lines $S_1$, $S_2$, ..., $S_n$ are grounded.

One pixel $P_{ij}$ is provided at each intersection between the signal lines $X_1$, $X_2$, ..., $X_m$ and the signal lines $Y_1$, $Y_2$, ..., $Y_n$ (and the source lines $S_1$, $S_2$, ..., $S_n$). That is, a pixel such as $P_{22}$ is constructed by an N-channel MOS transistor Q and a bolometer R. A source of the MOS transistor Q is connected to a ground terminal GND, and a drain of the MOS transistor Q is connected via the bolometers to the signal line $Y_2$ and via a transfer gate $TG_2$ to an output terminal OUT. Also, a gate of the MOS transistor Q is connected to the signal line $X_2$.

The bolometer R is made of titanium or its alloy. As a result, the 1/f noise can be reduced when a current is supplied to the bolometer R. Also, the specific resistance of the titanium bolometer R is so small as to reduce the thermal noise. Note that vanadium oxide, which is a semiconductor material suitable for the bolometer R, has a resistance change of 2%/deg, and titanium or its alloy has a resistance change of 0.3%/deg, i.e., about seven times that of vanadium oxide. However, the 1/f noise of titanium or its alloy is reduced by about seven times that of vanadium oxide, so that the S/N ratio as well as the sensitivity can be improved by the titanium bolometer R. Note that the ratio of vanadium oxygen in vanadium oxide varies and is unstable.

Also, platinum, nickel and gold have resistance changes of 0.04%/deg, 0.04%/deg, and 0.01%/deg, respectively, which are smaller that (0.3%/deg.) of titanium or its alloy. Therefore, the bolometer R made of titanium or its alloy is superior to the bolometer made of vanadium oxide in view of the sensitivity. Contrary to this, the specific resistance of titanium or its alloy is about 47 μΩ.cm, while the specific resistances of platinum, nickel and gold are 10 μΩ.cm, 7 μΩ.cm and 2 μΩ.cm, respectively. In this case, in order to suppress the 1/f noise, the resistance of the holemeter R should be sufficiently larger than the resistance of a wiring layer, the ON resistance of the MOS transistor Q and hhe ON resistance of the transfer gate such as $TG_2$. Note that the wiring layer, the MOS transistor Q and the transfer gate $TG_2$ are arranged between the ground terminal GND and the output terminal OUT. Therefore, platinum, nickel and gold having specific resistances lower than 10 μΩ.cm cannot be expected to provide a reduction of the thermal noise, since the resistances of the wiring layers and the transistors are predominent. Further, the thermal conductivities of platinum, nickel and gold are 0.75 W/cm.deg, 0.91 W/cm.deg and 3.3 W/cm.deg, while titanium or its alloy is about 0.22 W/cm.deg. Therefore, the bolemeter R made of titanium or its alloy has good thermal isolation characteristics.

Thus, since the bolemeter R is made of titanium or its alloy, the specific resistance is so small as to suppress the thermal noise, and also, the resistance change per unit temperature is so large and the thermal conductivity is so small as to improve the sensitivity. Further, even when a current is supplied, the 1/f noise can be suppressed.

Note that JP-A-5-206526 and JP-A-2-196929 disclose a bolometer-type infrared detecting apparatus using titanium. In JP-A-5-206526 and JP-A-2-196929, however, titanium is used as an infrared absorption layer, not as the bolometer, and use is made of amorphous silicon for the bolometer. Contrary to this, in FIG. 3, the bolometer R made of titanium or its alloy also serves as an infrared absorption layer.

Also, in FIG. 3, since the bolometer R is connected to the drain of the MOS transistor Q, the resistance of the bolometer R determines a current flowing through the MOS transistor Q, so that the 1/f noise is hardly observed, since the 1/f noise is a fluctuation of resistance. Note that, if the bolometer R is connected between the ground terminal GND and the source of the MOS transistor Q, when the MOS transistor Q is turned ON, the voltage drop by the bolometer R raises the voltage at the source of the MOS transistor Q, so that the ON resistance thereof is increased, i.e., the 1/f noise is increased.

Also, connected between the signal lines $Y_1, Y_2, \ldots, Y_n$ and the output terminal OUT are transfer gates $TG_1, TG_2, \ldots, TG_n$, each including a P-channel MOS transistor and an N-channel MOS transistor. That is, the bolemeter R is connected to the sources of the P-channel MOS transistor and the N-channel MOS transistor of the transfer gate such TG$_2$, while the drains thereof are connected to the output terminal OUT. In this case, a current flowing through the bolometer R depends upon a required signal amount thereof, and therefore, the voltage drop by the bolometer R depends upon this signal amount. As a result, the operation points of the transfer gates $TG_1, TG_2, \ldots, TG_n$ are changed in accordance with their corresponding bolometers R. However, in the P-channel transistor of each transfer gate, the ON resistance is larger when the source voltage is smaller. Contrary to this, in the N-channel transistor of each transfer gate, the ON resistance is smaller when the source voltage is smaller. Therefore, the ON resistance of each transfer gate is small at any operating point, to minimize the 1/f noise.

One of the signal lines $X_1, X_2, \ldots, X_n$ is sequentially selected by a vertical shift register 1 and AND circuits 2-1, 2-2, ..., 2-m. For example, when an output signal $\phi_{v2}$ of the vertial shift register 1 is "1" (high level), the voltage at the signal line $X_2$ is made high (=$V_v$). For example, $V_v$=5V. The vertical shift register 1 receives a vertical synchronization signal $V_{SYNC}$ and shifts it by receiving a horizontal synchronization signal $H_{SYNC}$.

One of the signal lines $Y_1, Y_2, \ldots, Y_n$, i.e., one of the transfer gates $TG_1, TG_2, \ldots, TG_n$ is sequentially selected by a horizontal shift register 3 and AND circuits 4-1, 4-2, ..., 4n. For example, when an output signal $\phi_{H2}$ of the horizontal shift register 3 is "1" (high level), the output of the AND circuit 4-2 is made high (=$V_H$). For example, $V_H$=5V. The horizontal shift register 3 receives a horizontal synchronization signal $H_{SYNC}$ and shifts it by receiving a synchronization clock signal SCK.

The horizontal synchronization signal $H_{SYNC}$ is a delayed signal of the horizontal synchronization signal $H_{SYNC}$ by a horizontal blanking time period $T_B$. For this, a delay circuit 5 having the time period $T_E$ is provided. That is, in the apparatus of FIG. 3, the signal lines $X_1, X_2, \ldots, X_m$ are, for example, made of polycrystalline silicon which has a relatively large resistance, while the signal lines $Y_1, Y_2, \ldots, Y_n$ as well as the source lines $S_1, S_2, \ldots, S_n$ are, for example, made of aluminium or its alloy which has a relatively small resistance. Also, the signal lines $X_1, X_2, \ldots, X_m$ have a large capacitance including the gate capacitances of the MOS transistors Q. Therefore, the time constant of the voltages at the signal lines $X_1, X_2, \ldots, X_m$ is larger than that of the voltages at the signal lines $Y_1, Y_2, \ldots, Y_n$. In order to carry out a horizontal operation sufficiently after the application of a pulse to the signal lines $X_1, X_2, \ldots, X_n$, the delay circuit 5 is provided to delay the horizontal synchronization signal $H_{SYNC}$.

Also, even when the signal lines $Y_1, Y_2, \ldots, Y_n$ are made of aluminum or its alloy, there are still small differences in resistance among the signal lines $Y_1, Y_2, \ldots, Y_n$. In order to compensate for these differences in resistance, the Ground terminal GND and the, output terminal OFf are diagonally located in relation to each other. As a result, the length of an electrical path between the ground teminal GND and the output terminal OUT via any of the MOS transistors Q can be equalized. In this case, note that the ground terminal GND is not always diagonally located in respect to the output terminal OUT as indicated by a dotted line. In other words, an electrical path via any of the MOS transistor Q is approximately diagonal within the pixel array, to compensate for the above-mentioned differences in resistance. Further, the width of the signal lines $Y_1, Y_2, \ldots, Y_n$ is the same as that of the source lines $S_1, S_2, \ldots, S_n$, and the width of a conductor connected to the ground terminal GND is the same as that of a conductor connected to the output terminal OUT, to further compensate for the above-mentioned differences in resistance.

The output terminal OUT is connected to an intergrator circuit 6. The integrator circuit 6 includes a bipolar transistor 61 whose emitter is connected to the output terlninal OUT, a capacitor 62 connected to a collector of the bipolar transistor 61, and a reset transistor 63 connected to the capacitor 62. The bipolar transistor 61 is activated by an integration time period signal $\phi_B$ which corresponds to each activation time period of the transfer gates $TG_1, TG_2, \ldots, TG_n$. Also, the reset transistor 63 is reset by a signal $\phi_R$ to cause an integration output signal $S_{OUT}$ of the integrator circuit 6 to be $V_R$.

In the integrator circuit 6, an integration time period $T_S$ determined by the integration time period signal $\phi_B$ is smiler than the activation time period of the transfer gates $TG_1, TG_2, \ldots, TG_n$ determined by one time period of the synchronization clock signal SCK to eliminate random noise and fixed pattern noise created by fluctuations of the activation time period of the transfer gates $TG_1, TG_2, \ldots TG_n$. Note that, if the integration time period $T_S$ is determined by the width of a pulse output from the horizontal shift register 3 while maintaining the voltage at the base of the bipolar transistor 61 at a definite value. the difference in characteristics between the MOS transistors of the horizontal shift register 3 and the AND circuits 4-1, 4-2, ..., 4-n create fluctuation of the operations of the MOS transistors Q to fluctuate the self-heat generation of the bolometers R thus generating the random noise and the fixed pattern noise.

In the apparatus of FIG. 3, a voltage applied to one pixel formed by the MOS transistor Q and the bolometer R is determined by the difference in potential between the emitter of the bipolar transistor 61 and the ground teminal GND, i.e., a voltage between the base of the bipolar transistor 61 and the ground terminal GND minus a built-in voltage of the bipolar transistor. Therefore, the voltage of the integration output signal $S_{OUT}$ is separated from that of each pixel. As a result, when the integration time period $T_S$ is increased to reduce the noise or when a current flowing through the bolometer is increased to increase the sensitivity, the amount of charges stored in the capacitor 62 are increased; however, in this case, the reset voltage $V_R$ can be set independent of the voltage applied to the pixel. Thus, the states of the bolometers R can be read out.

Figure 4A:
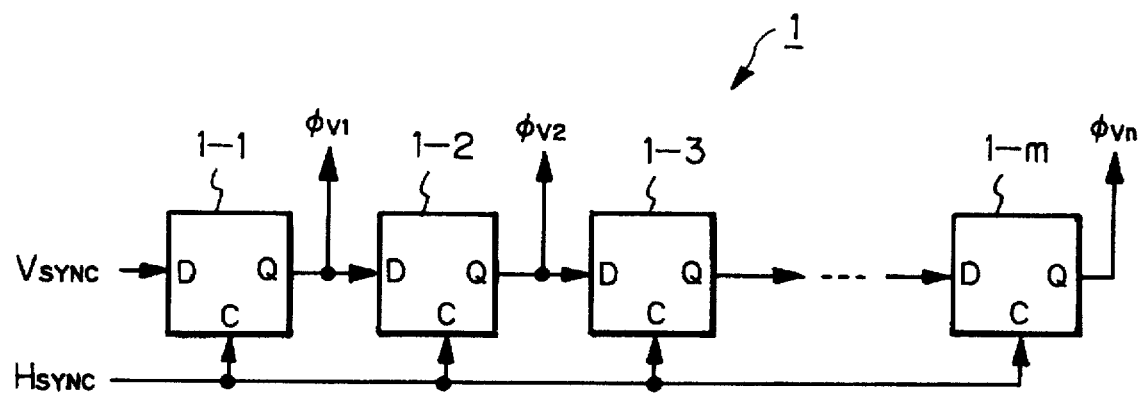
FIG. 4A is a detailed circuit diagram of the vertial shift register of FIG. 3.

In FIG. 4A, which is a detailed circuit diagram of the vertical shift register 1 of FIG. 3, the vertical shift register 1 includes D flip-flops 1-1, 1-2, ..., 1-m connected in series. The D flip-flop 1-1 receives the vertical synchronization signal $V_{SYNC}$, and all the D flip-flops 1-1, 1-2, ..., 1-m are clocked by the horizontal synchronization signal $H_{SYNC}$. Therefore, the vertical shift register 1 generates vertical selection signals $\phi_{V1}, \phi_{V2}, \ldots, \phi_{Vm}$ sequentially, so that the signal lines $X_1, X_2, \ldots, X_m$ are sequentially selected and activated.

Figure 4B:
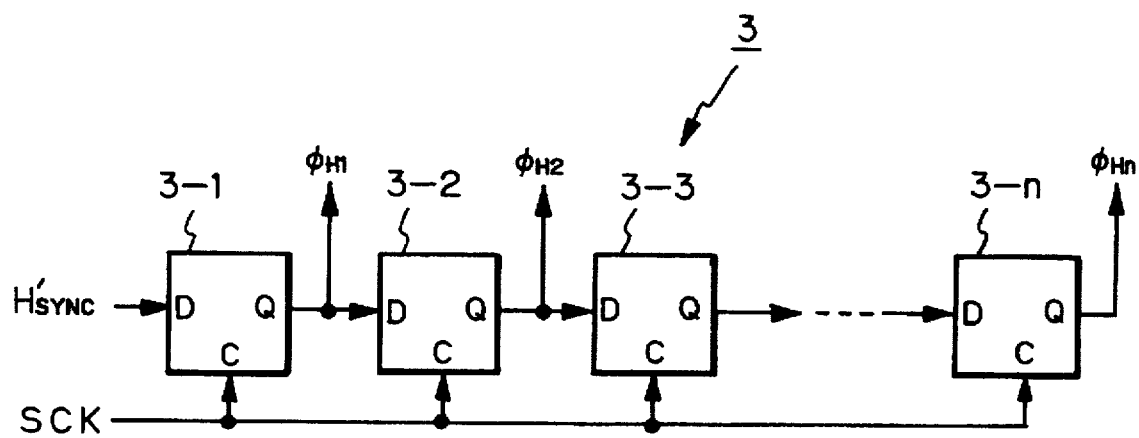
FIG. 4B is a detailed circuit diagram of the horizontal shift register of FIG. 3.

In FIG. 4B, which is a detailed circuit diagram of the horizontal shift register 3 of FIG. 3, the horizontal shift register 3 includes D flip-flops 3-1, 3-2, ..., 3-n connected in series. The D flip-flop 3-1 receives the horizontal synchronization signal $H_{SYNC}'$, and all the D flip-flops 3-1, 3-2, ..., 3-n are clocked by the synchronization clock signal SCK. Therefore, the horizontal shift register 3 generates horizontal selection signals $\phi_{H1}, \phi_{H2}, \ldots, \phi_{Hn}$ sequentially, so that the signal lines $Y_1, Y_2, \ldots, Y_n$ are sequentially selected and activated.

The operation of the bolometer-type infrared detecting apparatus of FIG. 3 is explained next with reference to FIGS. 5A through 5P.

when the vertical shift register 1 receives a vertical synchronization signal $V_{SYNC}$ as shown in FIG. 5A and a horizontal synchronization signal $H_{SYNC}$ as shown in FIG. 5B, the vertical shift register 1 generates vertical selection signals $\phi_{V1}, \phi_{V2}, \ldots, \phi_{Vm}$ sequentially as shown in FIGS. 5C, 5D, 5E and 5F.

As explained above, the horizontal synchronization signal $H_{SYNC}$ is delayed by the delay circuit 5 to generate a horizontal synchronization signal $H_{SYNC}'$ as shown in FIG. 5G and FIG. 5H which is an enlargement of FIG. 5G.

When the horizontal shift register 3 receives the horizontal synchronization signal $H_{SYNC}'$ as shown in FIG. 5H and a synchronization clock signal SCK as shown in FIG. 5I, the horizontal shift register 3 generates horizontal selection signals $\phi_{H1}, \phi_{H2}, \ldots, \phi_{Hm}$ sequentially as shown in FIGS. 5J, 5K, 5L and 5M.

Also, an integration time period signal $\phi_B$ as shown in FIG. 5N is supplied to the integration circuit 6. Also, a reset signal $\phi_R$ as shown in FIG. 5O is supplied to the reset transistor 63 6 after every integration time period $T_S$. Thus, an integration output signal $S_{OUT}$ is obtained as shown in FIG. 5P.

Figure 6:
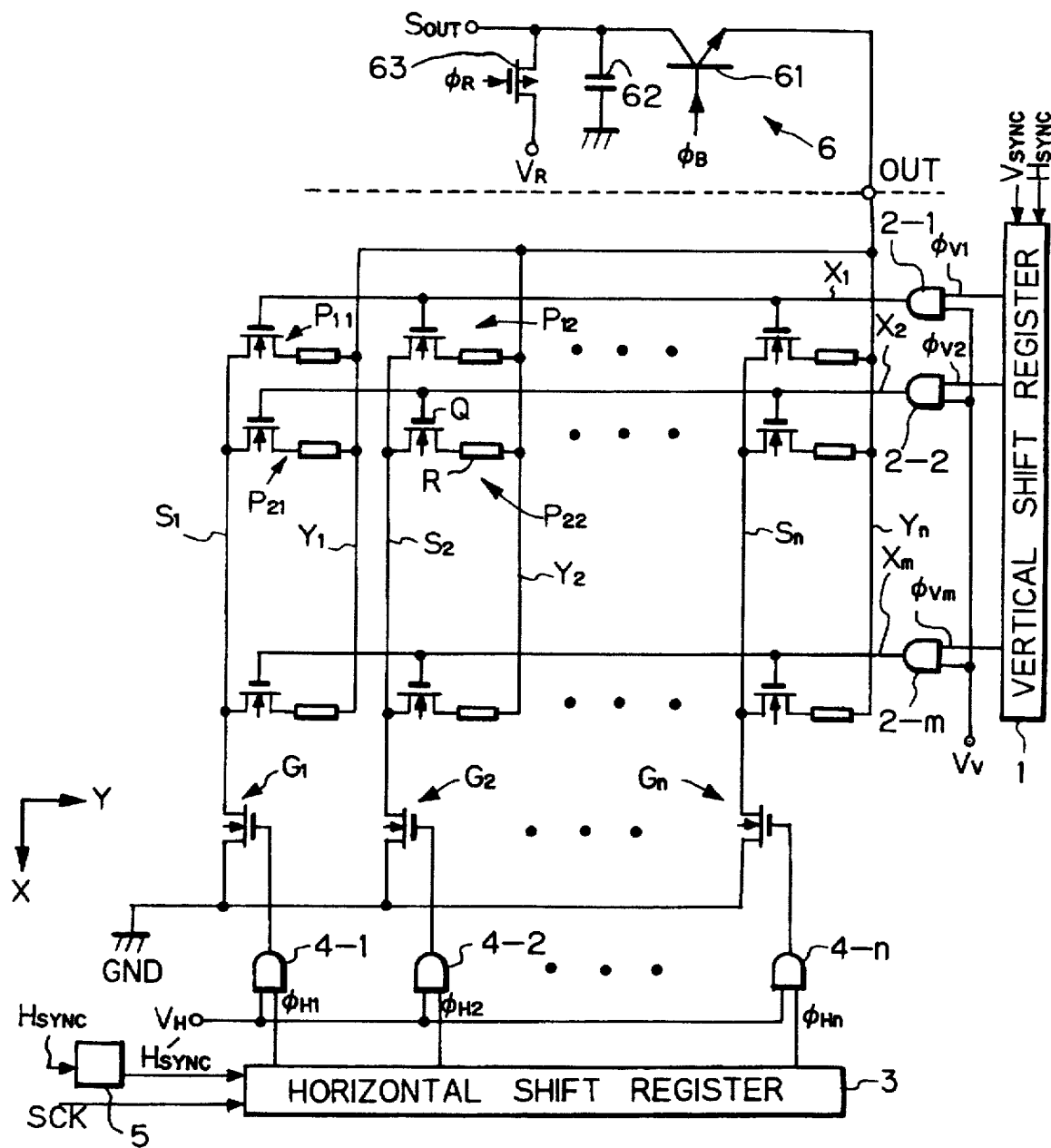
FIG. 6 is a circuit diagram illustrating a modification of the apparatus of FIG. 3.

In FIG. 6, which is a modification of the bolometer-type infrared detecting apparatus of FIG. 3, the ground teminal GND and the output terminal OUT are also diagonally located to each other in a different way from FIG. 3. Also, N-channel MOS transistors $G_1, G_2, \ldots, G_n$ are provided instead of the transfer gates $TG_1, TG_2, \ldots, TG_n$ of FIG. 3. Even in the apparatus of FIG. 6, the differences in resistance among the signal lines $Y_1, Y_2, \ldots, Y_n$ can be compensated for. In other words, the length of an electrical path between the ground terminal GND and the output terminal OUT via any of the MOS transistors Q can be equalized.

Figure 7:
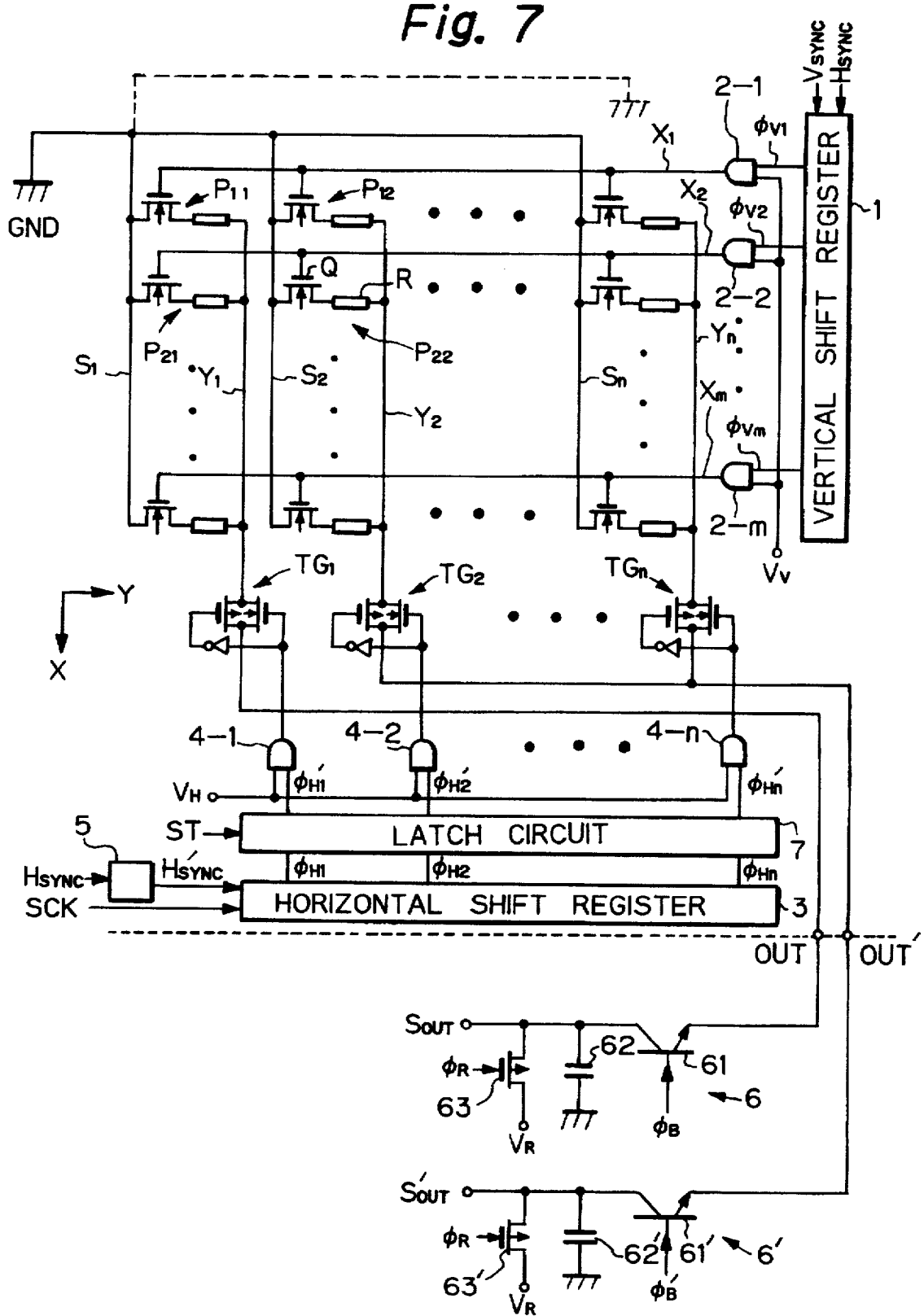
FIG. 7 is a circuit diagram illustrating a second embodiment of the bolometer-type infrared detecting apparatus.

In FIG. 7, which illustrates a second embodiment of the present invention, an output terminal OUT' and an integrator circuit 6' connected to the output terminal OUT' are added to the elements of FIG. 3. Note that the integrator circuit 6' has the same configuration as the integrator circuit 6. In this case, the transfer gates $TG_1, TG_3, \ldots, TG_{n-1}$ are connected to the output terminal OUT, and the transfer gates $TG_2$, $TG_4, \ldots, TG_n$ are connected to the output terminal OUT'. Further, a latch circuit 7 is provided between the horizontal shift register 3 and the transfer gates $TG_1, TG_2, \ldots, TG_n$ of FIG. 3. The latch circuit 7 receives the horizontal selection signals $\phi_{H1}, \phi_{H2}, \ldots, \phi_{Hn}$ from the horizontal shift register 3 and generates horizontal selection signals $\phi_{H1}', \phi_{H2}', \ldots, \phi_{Hn}'$ in response to a strobe signal ST. According to the apparatus of FIG. 7, two pixels can be simultaneously read, in other words, an integration time period can be twice that of the apparatus of FIG. 3.

Figure 8:
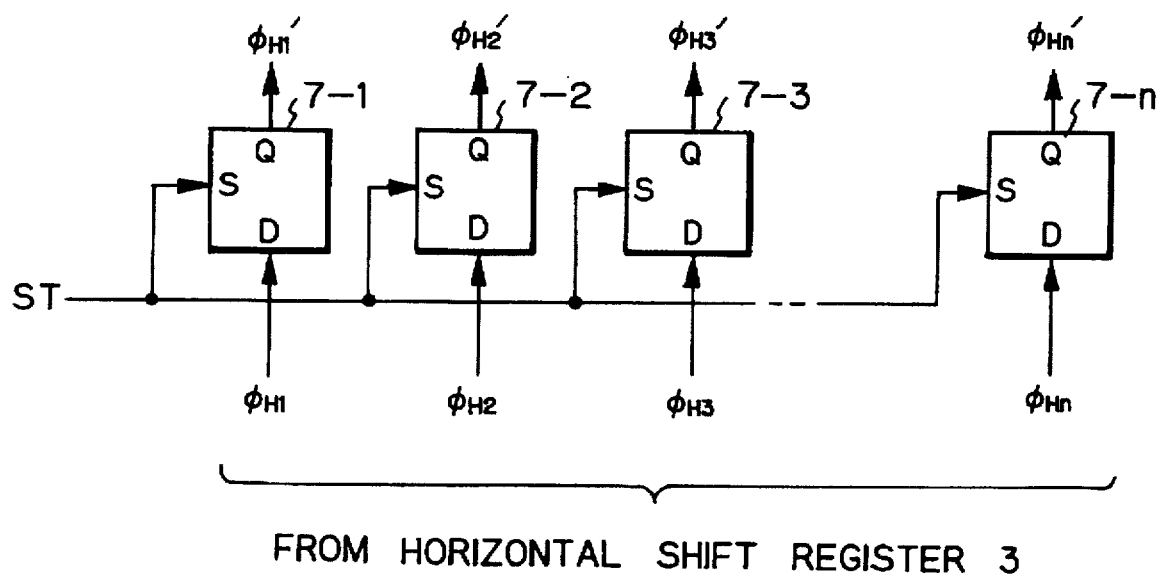
FIG. 8 is a detailed circuit diagram of the latch circuit of FIG. 7.

In FIG. 8, which is a detailed circuit diagram of the latch circuit 7 of FIG. 7, the latch circuit 7 includes latches 7-1, 7-2, ..., 7-n connected in parallel, which receive the horizontal selection signals $\phi_{H1}, \phi_{H2}, \ldots, \phi_{Hn}$, respectively, from the horizontal shift register 3. The latches 7-1, 7-2, ..., 7-n are controlled by the strobe signal ST.

Figure 9:
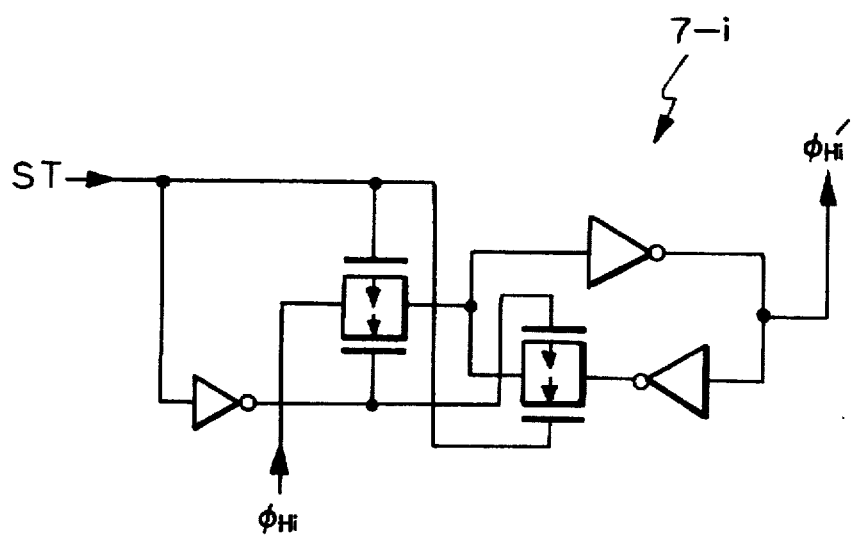
FIG. 9 is a detailed circuit diagram of the one element of latch circuit of FIG. 8.

Each of the latches 7-1, 7-2, ..., 7-n is illustrated in FIG. 9. In the figure, when ST="0" (low level), the latch 7-i is in a hold state, while, when ST="1" (high level), the latch 7-i is in a through state, i.e., the horizontal selection signal $\phi_{H1}$ is equal to the horizontal selection signal $\phi_{H1}'$. Therefore, when the strobe signal ST is switched from "1" to "0", the latch 7-i is switched from a through state to a hold state.

A first operation of the bolometer-type infrared detecting apparatus of FIG. 7 is explained next with reference to FIGS. 10A through 10Q.

Figure 10:
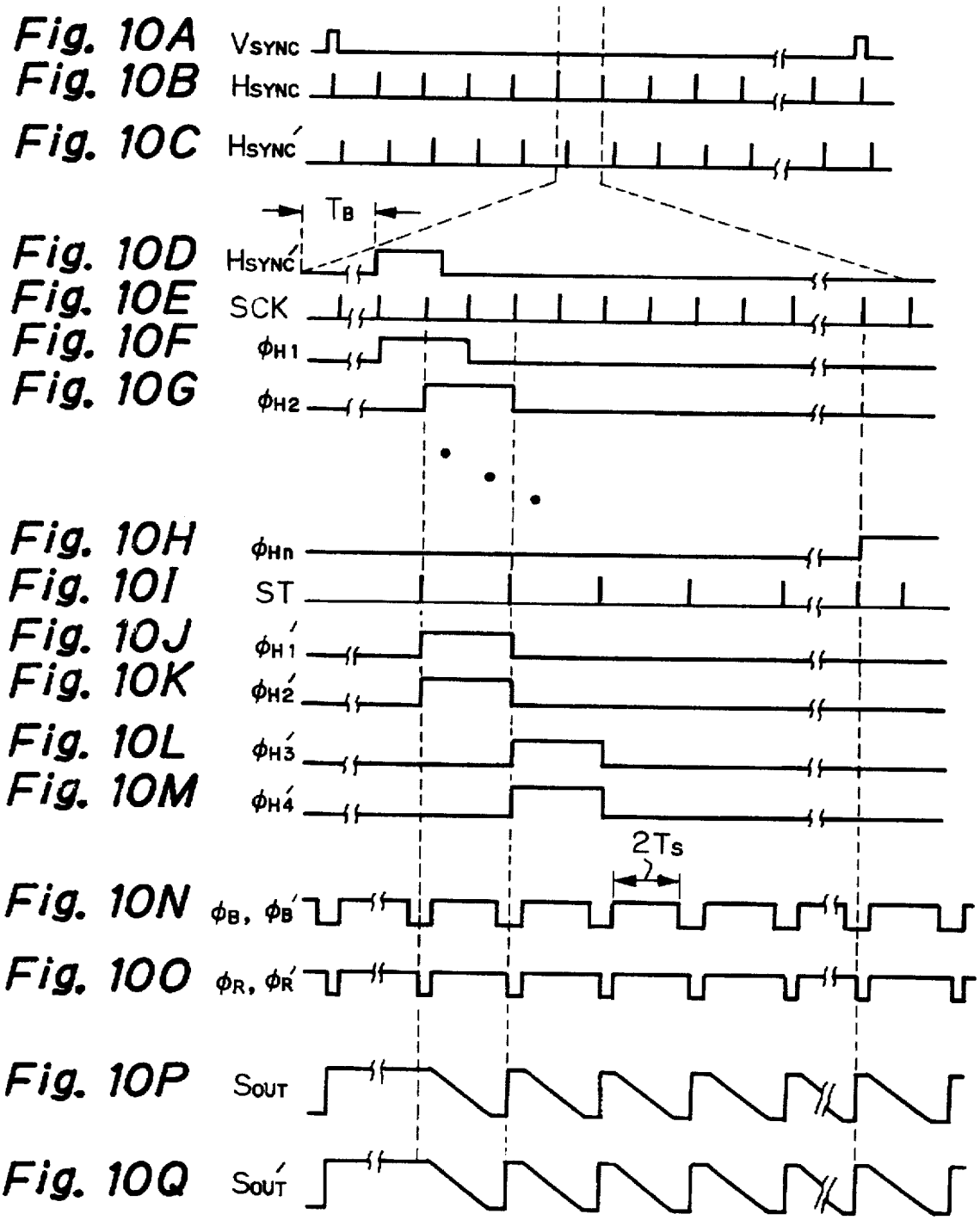
FIGS. 10A through 10Q are timing diagrams for showing a first operation of the apparatus of FIG. 7.

The vertical shift register 1 operates in the same way as in the first embodiment by using the vertical synchronization signal $V_{SYNC}$ and the horizontal synchronization signal $H_{SYNC}$ as shown in FIGS. 10A and 10B, and therefore, the description of the signal lines $X_1, X_2, \ldots, X_m$ is omitted.

As shown in FIGS. 10C and 10D, a delayed synchronization signal $H_{SYNC}'$ has a time period only enough long to cover two synchronization clock signals SCK as shown in FIG. 10E.

When the horizontal shift register 3 receives the horizontal synchronization signal $H_{SYNC}'$ as shown in FIG. 10D and the synchronization clock signal SCK as shown in FIG. 10E, the horizontal shift register 3 generates horizontal selection signals $\phi_{H1}, \phi_{H2}, \ldots, \phi_{Hn}$ as shown in FIGS. 10F, 10G and 10H, whose time periods are twice those in FIGS. 5J, 5K, 5L and 5M.

As shown in FIGS. 10E and 10I, the strobe signal ST has half the frequency of the synchronization clock signal SCK. Therefore, the latch circuit 7 generates horizontal selection signals $\phi_{H1}'$ and $\phi_{H2}'$ which are the same as each other as shown in FIGS. 10J and 10K, horizontal selection signals $\phi_{H3}'$ and $\phi_{H4}'$ which are the same as each other as shown in FIGS. 10L and 10M, and the like.

Also, integration time period signals $\phi_B$ end $\phi_B'$, which are in this case the same as each other as shown in FIG. 10N, are supplied to the integrator circuits 6 and 6'. Note that the integration time period signals $\phi_B$ and $\phi_B'$ in FIG. 10N has twice the time period of the integration time period signal $\phi_B$ in FIG. 5N. Also, reset signals $\phi_R$ and $\phi_R'$, which are in this case the same as each other as shown in FIG. 10O, are supplied to the integrator circuits 6 and 6' after every integration time period $2T_s$. Thus, integration output signals $S_{OUT}$ and $S_{OUT}'$ are obtained as shown in FIGS. 10P and 10Q.

A second operation of the bolometer-type infrared detecting apparatus of FIG. 7 is explained next with reference to FIGS. 11A through 11R.

Figure 11:
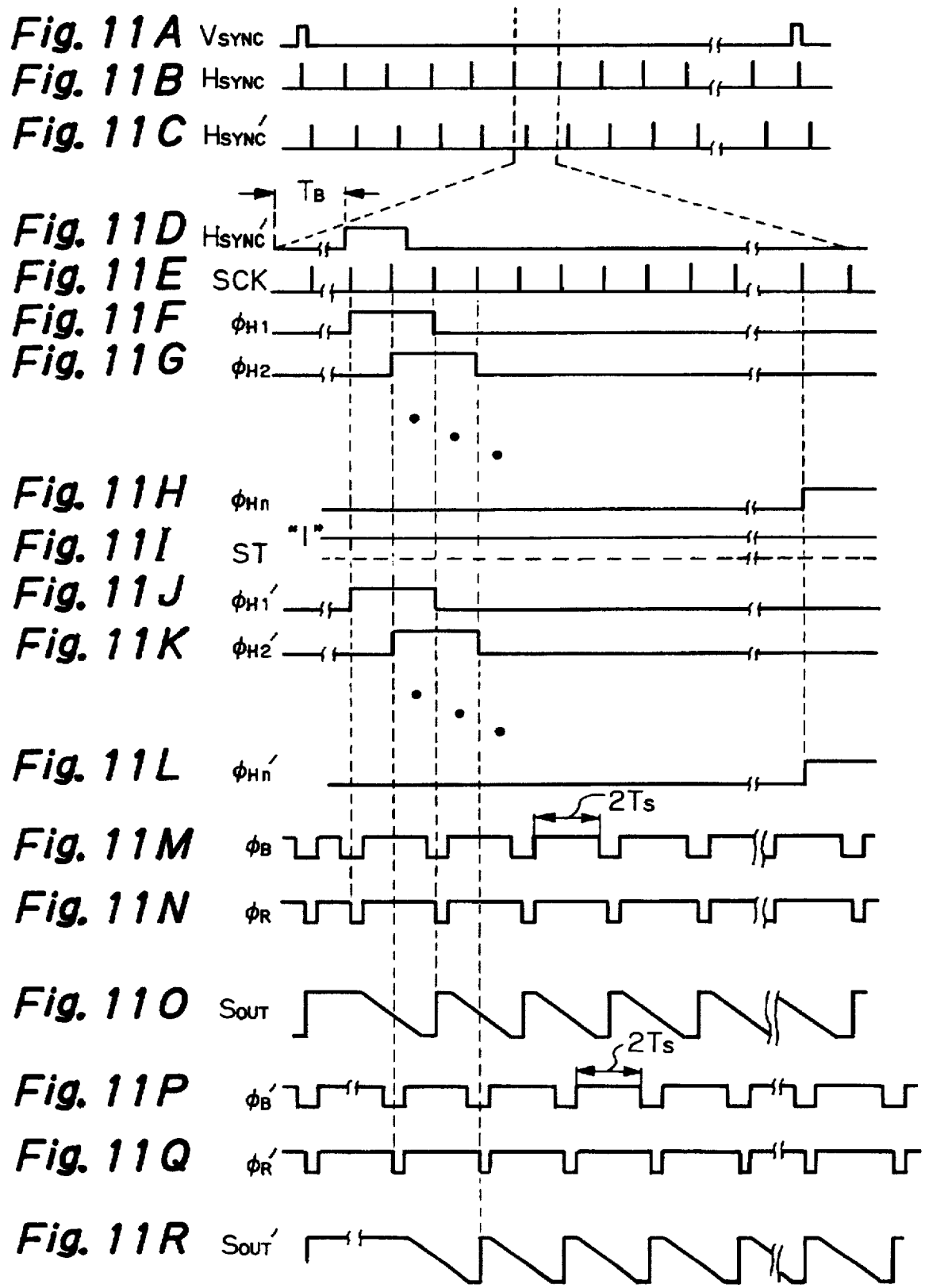
FIGS. 11A through 11R are timing diagrams for showing a second operation of the apparatus of FIG. 7.

In the second operation, the strobe signal ST is always made "1" (high level) as shown in FIG. 11L. As a result, the latch circuit 7 is in a through state, so that the horizontal selection signals $\phi_{H1}'$, $\phi_{H2}'$, ..., $\phi_{Hn}'$ are the same as the horizontal selection signals $\phi_{H1}$, $\phi_{H2}$, ..., $\phi_{Hn}$, respectively, as shown in FIGS. 11F, 11G, 11H, 11J, 11K and 11L.

Also, as shown in FIGS. 11M, 11N, 11P and 11Q, the integration time period signal $\phi_B'$ and the reset signal $\phi_R'$ for the integrator circuit 6' are shifted by one time period of the synchronization clock signal SCK from the integration time period $\phi_B$ and the reset signal $\phi_R$ for the integrator circuit 6. As a result, as shown in FIG. 11O and 11R, the integration output signals $S_{OUT}$ and $S_{OUT}'$ are obtained.

In both of the first and second operations as shown in FIGS. 10A through 10Q and FIGS. 11A through 11R, the integration time period ($=2T_s$) can be twice that ($=T_s$) of the apparatus of FIG. 3.

Figure 12:
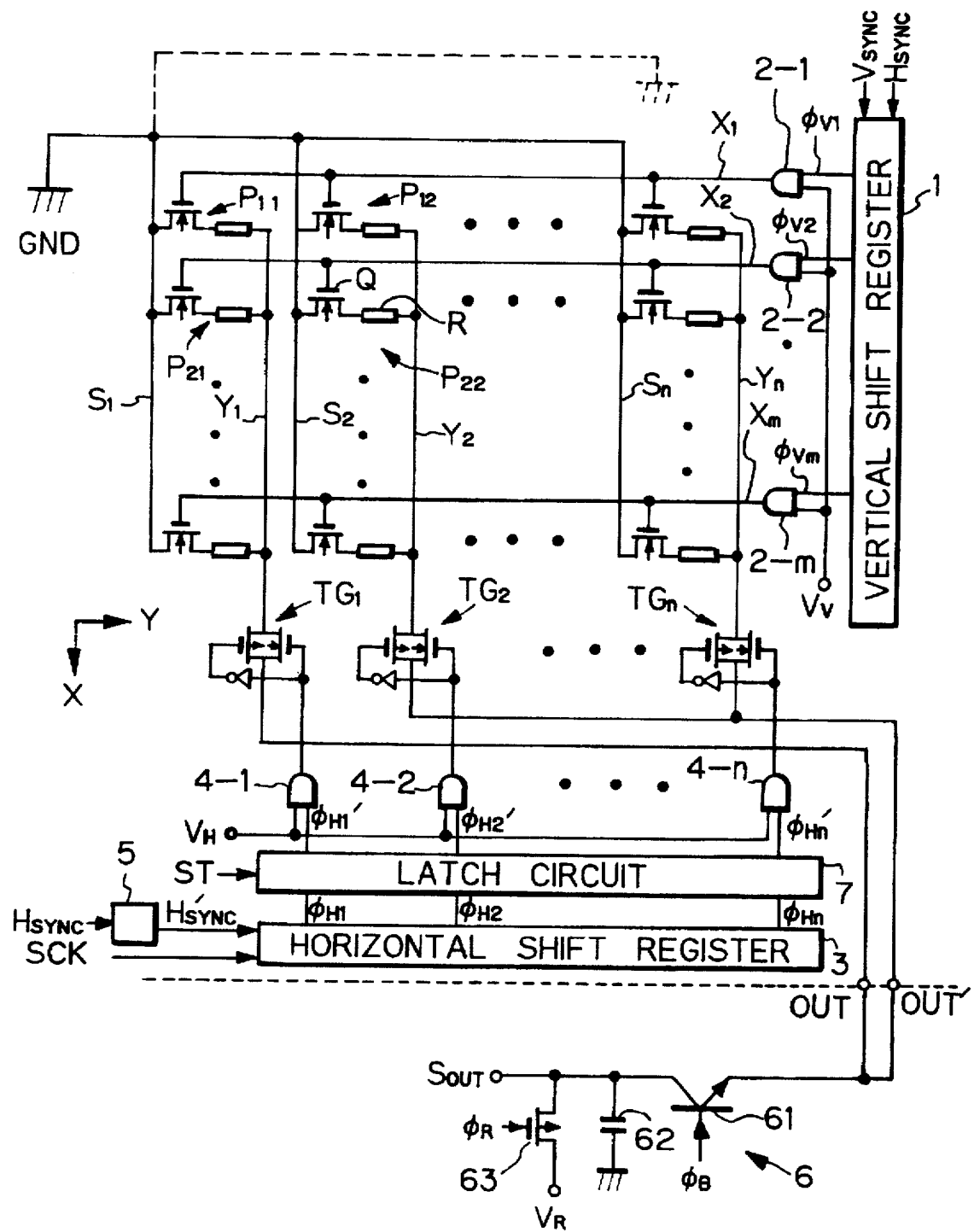
FIG. 12 is a circuit diagram illustrating a modification of the apparatus of FIG. 7.

In FIG. 12, which is a modification of the bolometer-type infrared detecting apparatus of FIG. 7, only the integrator circuit 6 is connected to the output terminals OUT and OUT'.

An operation of the bolometer-type infrared detecting apparatus of FIG. 12 is explained next with reference to FIGS. 13A through 13O.

Figure 13:
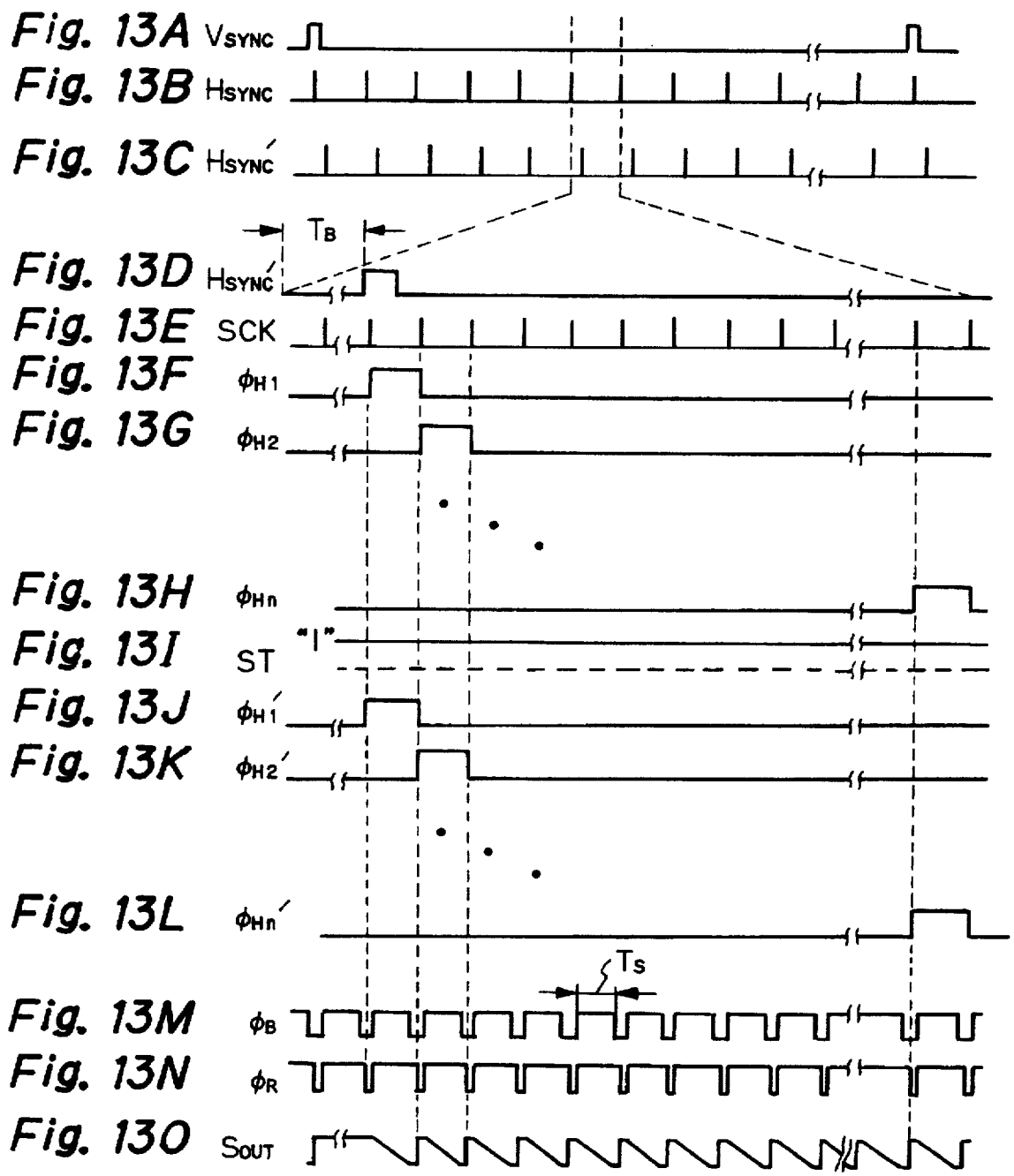
FIGS. 13A through 13O are timing diagrams for showing the operation of the apparatus of FIG. 12.

The vertical shift register 1 operates in the same way as in the first embodiment by using the vertical synchronization signal $V_{SYNC}$ and the horizontal synchronization signal $H_{SYNC}$ as shown in FIGS. 13A and 13B, and therefore, the description of the signal lines $X_1$, $X_2$, ..., $X_m$ is omitted.

Also, as shown in FIGS. 13C and 13D, a delayed synchronization signal $H_{SYNC}'$ has a period only enough long to cover one synchronization clock signal SCK as shown in FIG. 13E.

When the horizontal shift register 3 receives the horizontal synchronization signal $H_{SYNC}'$ as shown in FIG. 13D and the synchronization clock signal SCK as shown in FIG. 13E, the horizontal shift register 3 generates horizontal selection signals $\phi H_1$, $\phi H_2$, ..., $\phi H_n$ as shown in FIGS. 13F, 13G and 13H, whose time periods are the same as those in FIGS. 5J, 5K, 5L and 5M.

Further, the strobe signal ST is always made "1" (high level) as shown in FIG. 13I. As a result, the latch circuit 7 is in a through state, so that the horizontal selection signals $\phi H_1'$, $\phi H_2'$, ..., $\phi H_n'$ are the same as the horizontal selection signals $\phi H_1$, $\phi H_2$, ..., $\phi H_n$, respectively, as shown in FIGS. 13F, 13G, 13H, i3J, 13K and 13L.

Also, as shown in FIGS. 13M, and 13N, the integration time period signal $\phi_n$ and the reset signal $\phi_R$ are supplied to the integrator circuit 6. As a result, as shown in FIG. 13O, the integration output signal $S_{OUT}$ is obtained.

Thus, the bolometer-type infrared detecting apparatus of FIG. 12 with the latch circuit 7 operates in the same way as the bolometer-type infrared detecting apparatus of FIG. 3 without the latch circuit 7.

Figure 14:
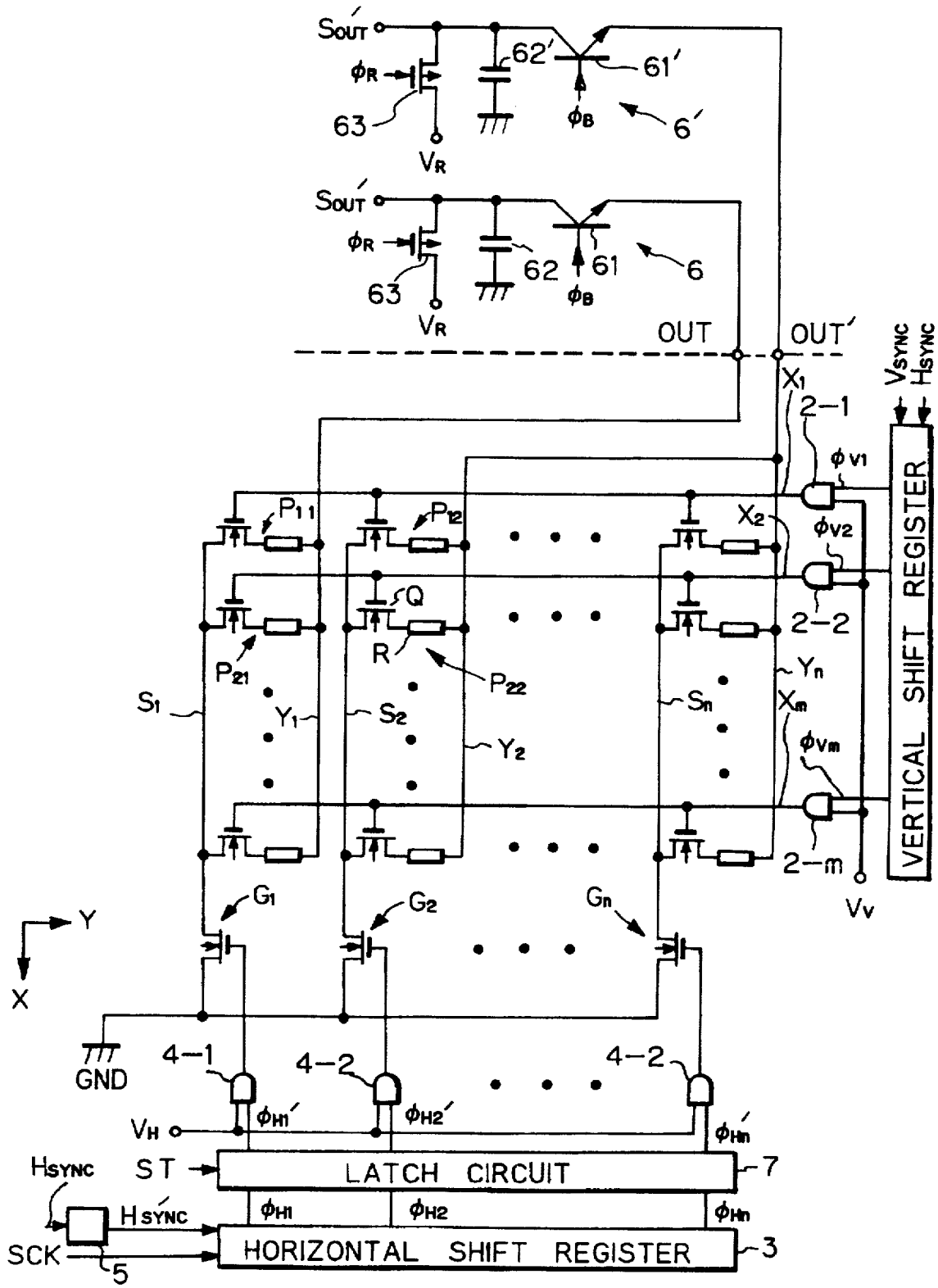
FIG. 14 is a circuit diagram illustrating another modification of the apparatus of FIG. 7.

In FIG. 14, which is a modification of the bolometer-type infrared detecting apparatus of FIG. 7, the ground terminal GND and the output terminal OUT are also diagonally located to each other in a different way from FIG. 7. Also, N-channel MOS transistors $G_1$, $G_2$, ..., $G_n$ are provided instead of the transfer gates $TG_1$, $TG_2$, ..., $TG_n$ of FIG. 7. Even in the apparatus of FIG. 14, the differences in resistance among the signal lines $Y_1$, $Y_2$, ..., $Y_n$ can be compensated for. In other words, the length of an electrical path between the ground terminal GND and the output terminal OLT via any of the MOS transistors Q can be equalized.

Figure 15:
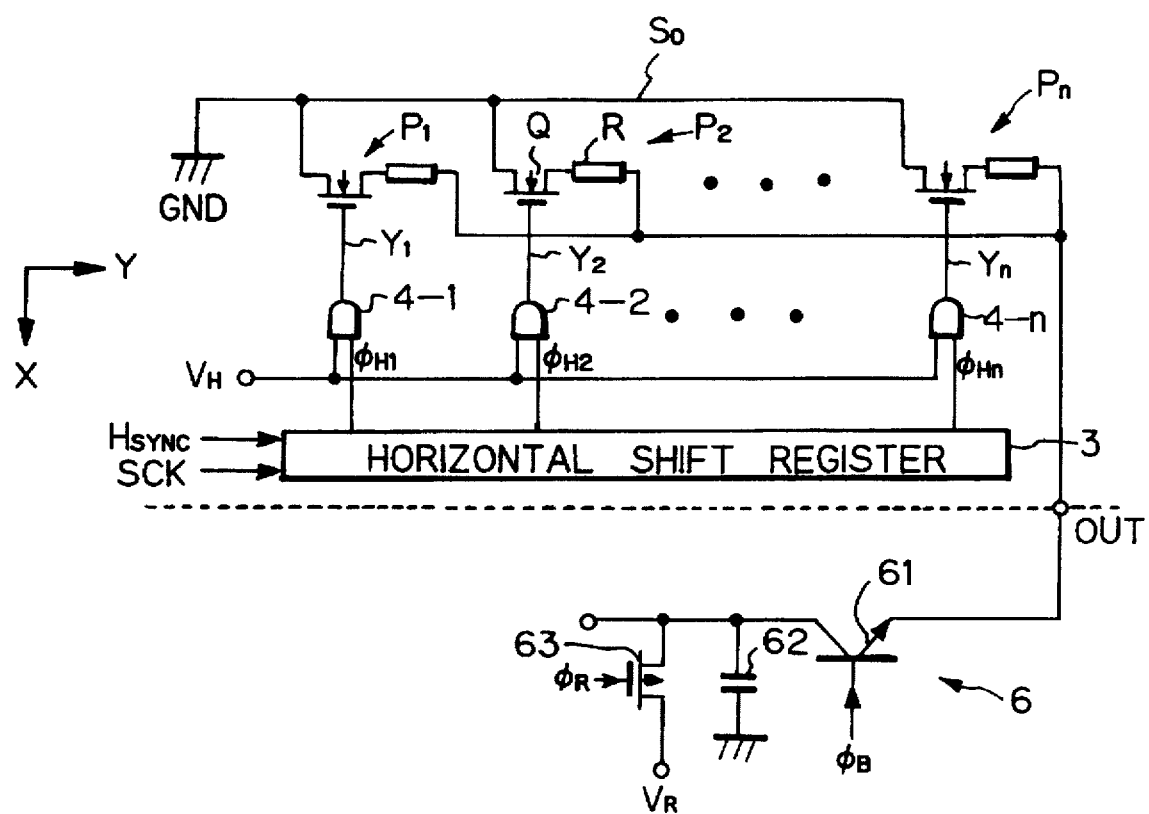
FIG. 15 is a circuit diagram illustrating a third embodiment of the bolometer-type infrared detecting apparatus.

In FIG. 15, which illustrates a third embodiment of the present invention, a one-dimensional bolometer-type infrared detecting apparatus is illustrated. That is, a source line $S_o$ connected to the ground terminal GND is arranged along the X direction, while signal lines $Y_1$, $Y_2$, ..., $Y_n$ are arranged in parallel along the Y direction.

One pixel Pj (j=1, 2, ..., n) is provided at each intersection between the source line $S_O$ and the signal lines $Y_1$, $Y_2$, ..., $Y_n$. That is, the pixel such as $P_2$ is constructed by an N-channel MOS transistor Q and a bolometer R. A source of the MOS transistor Q is connected to the ground terminal GND, and a drain of the MOS transistor Q is connected via the bolometer R to the output terminal OUT. Also, a gate of the MOS transistor Q is connected to one of the signal lines $Y_1$, $Y_2$, ..., $Y_n$.

Also, in FIG. 15, since the bolometer R is connected to the drain of the MOS transistor Q, the resistance of the bolometer R determines a current flowing tiaough the MOS transistor Q, so that the 1/f noise is hardly observed, since the 1/f noise is a fluctuation of resistance.

One of the signal lines $Y_1$, $Y_2$, ..., $Y_n$ is sequentially selected by a horizontal shift register 3 and AND circuits 4-1, 4-2, ..., 4-m. For example, when an output signal $\phi_{H2}$ of the horizontal shift register 3 is "1" (high level), the voltage at the signal line $Y_2$ is made high ($=V_H$). The horizontal shift register 3 receives a horizontal synchronization signal $H_{sync}$ and shifts it by receiving a synchronization clock signal SCK.

The operation of the bolometer-type infrared detecting apparatus of FIG. 15 is explained next with reference to FIGS. 16A through 16I.

When the horizontal skirt register 3 receives the horizontal synchronization signal $H_{SYNC}$ as shown in FIG. 16A and the synchronization clock signal SCK as shown in FIG. 16B, the horizontal shift register 3 generates horizontal selection signals $\phi_{H1}$, $\phi_{H2}$, $\phi_{H3}$, ..., $\phi_{Hn}$ sequentially as shown in FIGS. 16C, 16D, 16E, and 16F.

Also, an integration time period signal $\phi$Bas shown in FIG. 16G is supplied to the integration circuit 6. Also, a reset signal $\phi_R$ as shown in FIG. 16H is supplied to the integrator circuit 6 after every integration time period $T_S$. Thus, an integration output $S_{OUT}$ is obtained as shown in FIG. 16I.

Figure 17:
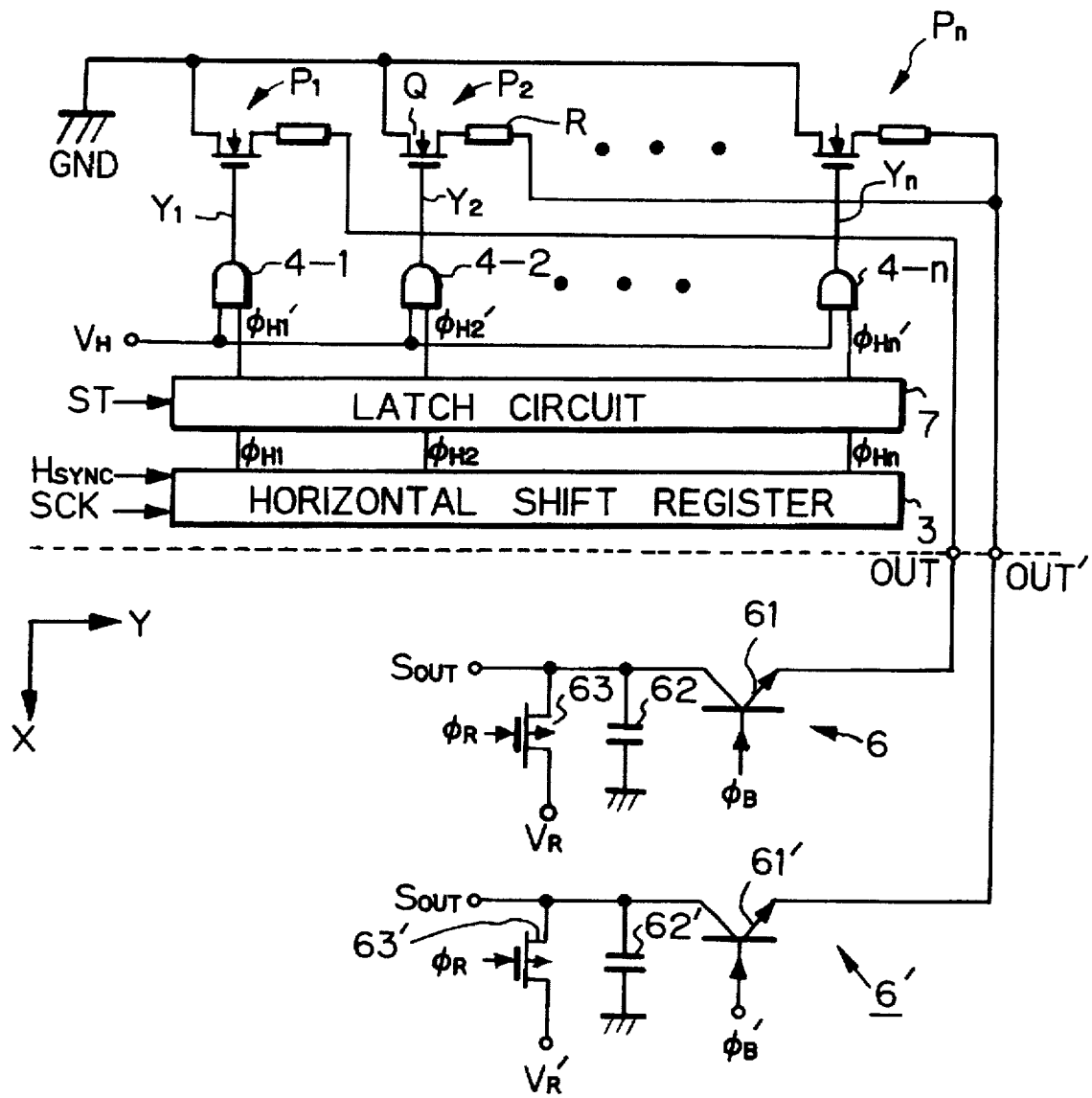
FIG. 17 is a circuit diagram illustrating a forth embodiment of the bolometer-type infrared detecting apparatus.

In FIG. 17, which illustrates a fourth embodiment of the present invention, an output terminal OUT' and an integrator circuit 6' connected to the output terminal OUT' are added to the elements of FIG. 15. Note that the integrator circuit 6' has the same configuration as the integrator circuit 6. In this case, the pixels $P_1$, $P_3$, ..., $P_{n-1}$ are connected to the output terminal OUT, and the pixels $P_2$, $P_4$, ..., $P_n$ are connected to the output terminal OUT'. Further, a latch circuit 7 is provided between the horizontal shift register 3 and the AND circuits 4-1, 4-2, ..., 4-n of FIG. 15. The latch circuit 7 receives the horizontal selection signals $\phi_{H1}$, $\phi_{H2}$, ..., $\phi_{Hn}$ from the horizontal shift register 3 and generates horizontal selection signals $\phi_{H1}'$, $\phi_{H2}'$, ..., $\phi H_{Hn}'$ in response to a strobe signal ST. According to the apparatus of FIG. 17. two pixels can be simultaneously read, in other words, an integration time period can be twice that of the apparatus of FIG. 15.

A first operation of the bolometer-type infrared detecting apparatus of FIG. 17 is explained next with reference to FIGS. 18A through 18N.

Figure 18:
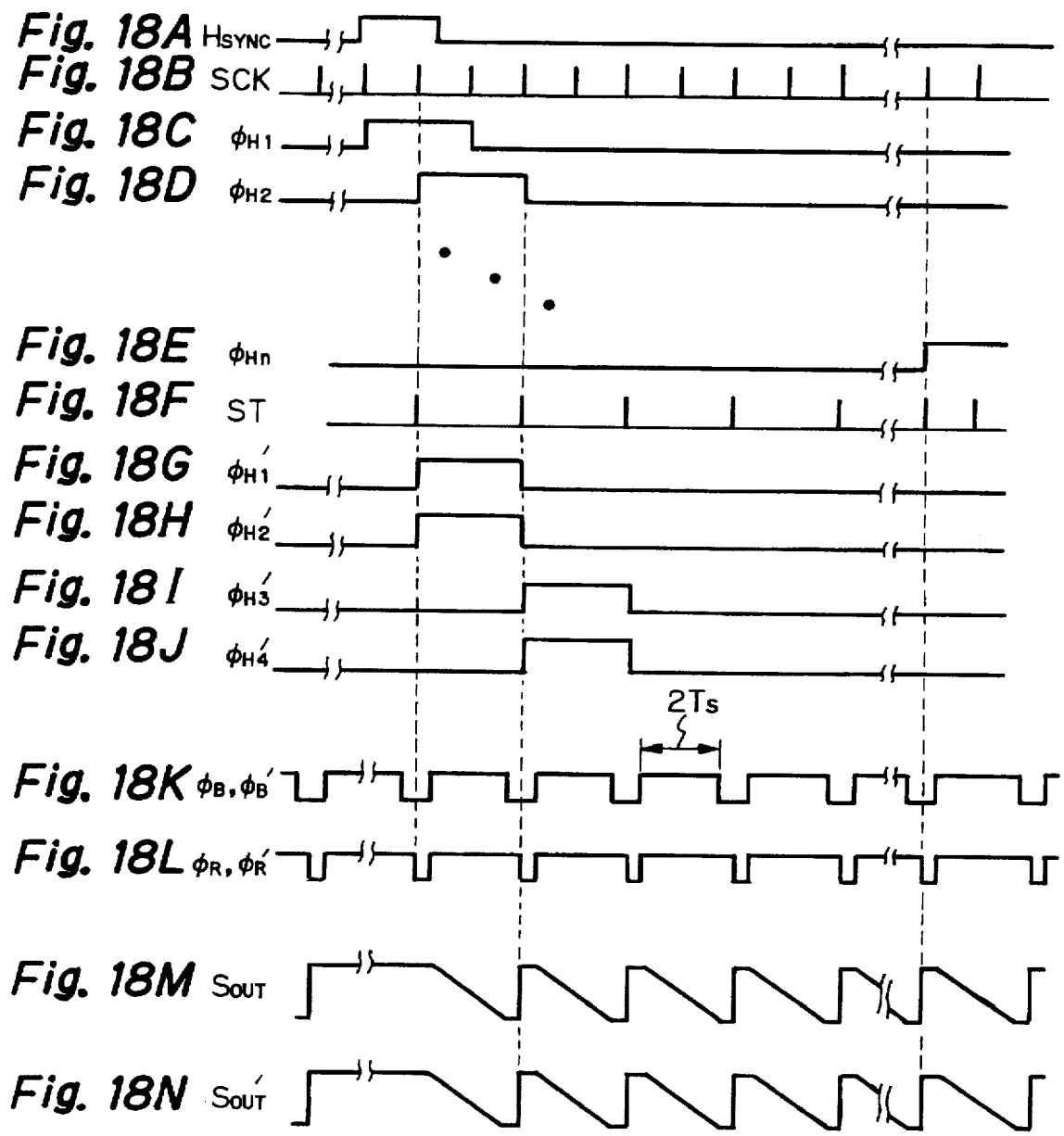
FIGS. 18A through 18N are timing diagrams for showing a first operation of the apparatus of FIG. 17.

As shown in FIGS. 18A and 18B, the synchronization signal $H_{SYNC}$ has a time period only long enough to cover two synchronization clock signals SCK.

When the horizontal shift register 3 receives the horizontal synchronization signal $H_{SYNC}$ as shown in FIG. 18A and the synchronization clock signal SCK as shown in FIG. 18B, the horizontal shift register 3 generates horizontal selection signals $\phi_{H1}$, $\phi_{H2}$, ..., $\phi_{Hn}$ as shown in FIGS. 18C, 18D and 18E, whose time periods are twices those in FIGS. 16C, 16D, 16E and 16F.

As shown in FIGS. 18B and 18F, the strobe signal ST has half the frequency of the synchronization clock signal SCK. Therefore, the latch circuit 7 generates horizontal selection signals $\phi_{H1}'$ and $\phi_{H2}'$ which are the same as each other as shown in FIGS. 18G and 18H, horizontal selection signals $\phi_{H3}'$ and $\phi_{H4}'$ which are the same as each other as shown in FIGS. 18I and 18J, and the like.

Also, integration time period signals $\phi_B$ and $\phi_B'$, which are in this case the same as each other as shown in FIG. 18K, are supplied to the integrator circuits 6 and 6'. Note that the integration time period signals $\phi_B$ and $\phi_B'$ in FIG. 18K have twice the time period of the integration time period signal $\phi_B$ in FIG. 16G. Also, reset signals $\phi_R$ and $\phi_R'$, which are in this case the same as each other as shown in FIG. 18L, are supplied to the integrator ciucuits 6 and 6' after every integration time period $2T_s$. Thus, integration outputs $S_{OUT}$ and $S_{OUT}'$ are obtained as shown in FIGS. 18M and 18N.

A second operation of the bolometer-type infrared detecting apparatus of FIG. 17 is explained next with reference to FIGS. 19A through 19O.

Figure 19:
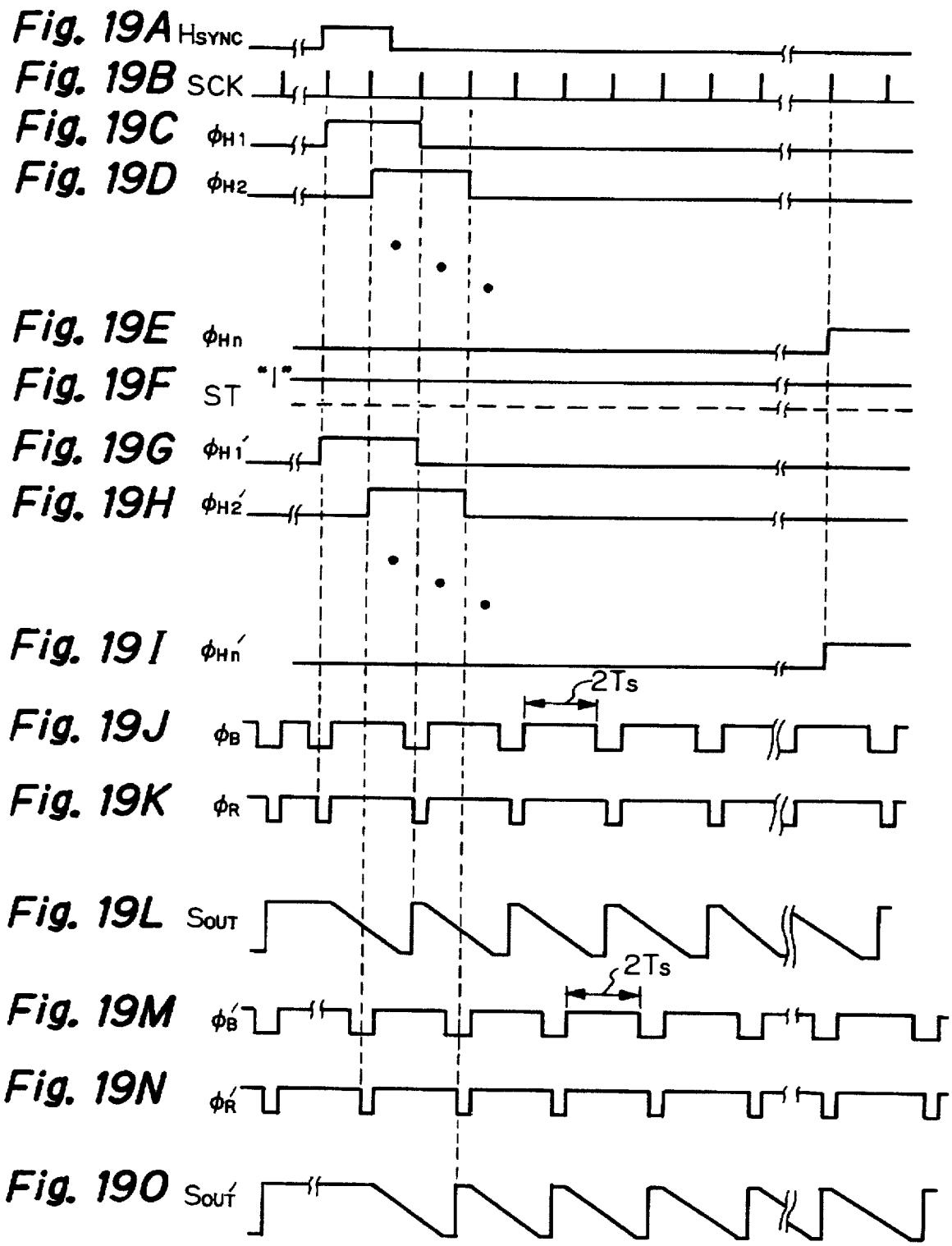
FIGS. 19A through 19O are timing diagrams for showing a second operation of the apparatus of FIG. 17.

In the second operation, the strobe signal ST is always made "1" (high level) as shown in FIG. 19F. As a result, the latch circuit 7 is in a through state, so that the horizontal selection signals $\phi_{H1}'$, $\phi_2'$, ..., $\phi_{Hn}'$ are the same as the horizontal selection signals $\phi_{H1}$, $\phi_{H2}$, ..., $\phi_{Hn}$, respectively, as shown in FIGS. 19C, 19D, 19E, 19G, 19H and 19I.

Also, as shown in FIGS. 19J, 19K, 19M and 19N, the integration time period signal $\phi_B'$ and the reset signal $\phi_R'$ for the integrator circuit 6' are shifted by one time period of the synchronization clock signal SCK from the integration time period $\phi_B$ and the reset signal $\phi_R$ for the integrator circuit 6. As a result, as shown in FIG. 19L and 19O, the integration output signals $S_{OUT}$ and $S_{OUT}'$ are obtained.

In Both of the first and second operations as shown in FIGS. 18A through 18N and FIGS. 19A through 19O, the integration time period ($=2T_s$) can be twice that ($=T_s$) of the apparatus of FIG. 15.

Figure 20:
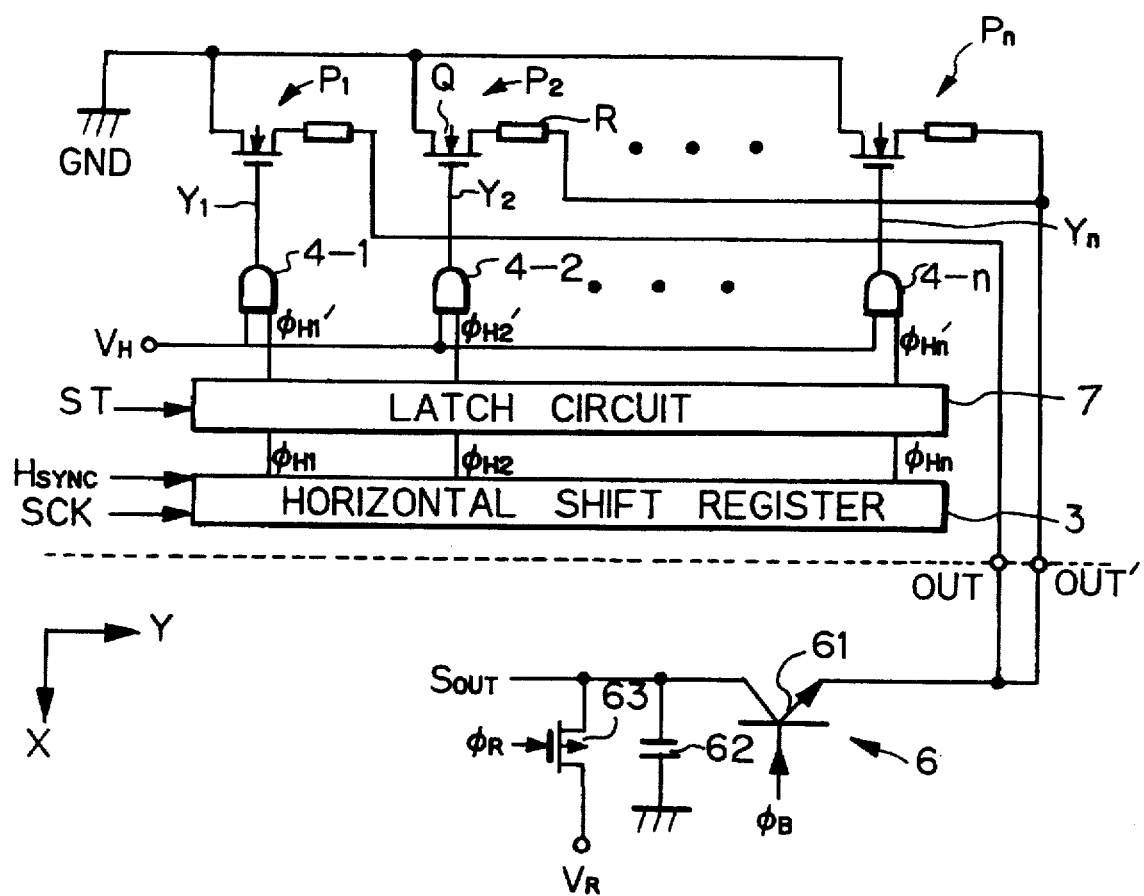
FIG. 20 is a circuit diagram illustrating a modification of the apparatus of FIG. 17.

In FIG. 20, which is a modification of the bolometer-type infrared detecting apparatus of FIG. 17, only the integrator circuit 6 is connected to the output terminals OUT and OUT'.

An operation of the bolometer-type infrared detecting apparatus of FIG. 20 is explained next with reference to FIGS. 21A through 21L.

Figure 21:
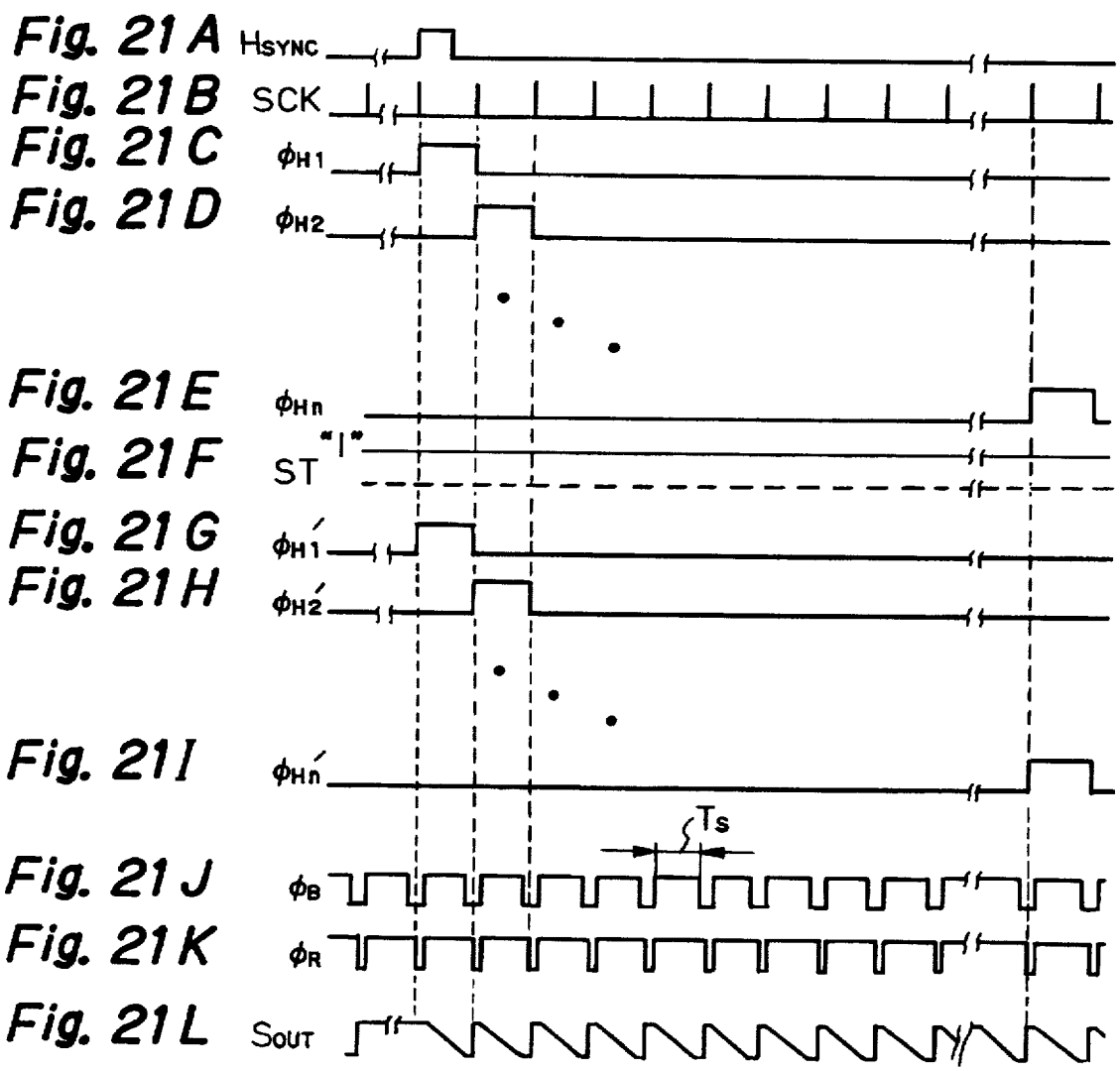
FIGS. 21A through 21L are timing diagrams for showing the operation of the apparatus of FIG. 20.

As shown in FIGS. 21A and 21B, a synchronization signal $H_{SYNC}$ has a period only enough long to cover one synchronization clock signal SCK.

When the horizontal shift register 3 receives the horizontal synchronization signal $H_{SYNC}$ as shown in FIG. 21A and the synchronization clock signal SCK as shown in FIG. 21B, the horizontal shift register 3 generates horizontal selection signals $\phi_{H1}$, $\phi_{H2}$, ..., $\phi_{Hn}$ as shown in FIGS. 21C, 21D and 21E, whose time periods are the same as those in FIGS. 16C, 16D, 16E and 16F.

Further, the strobe signal ST is always made "1" (high level) as shown in FIG. 21F. As a result, the latch circuit 7 is in a through state, so that the horizontal selection signals $\phi_{H1}'$, $\phi_{H2}'$, ..., $\phi_{Hn}'$ are the same as the horizontal selection signals $\phi_{H1}$, $\phi_{H2}$, ..., $\phi_{Hn}$, respectively, as shown in FIGS. 21C, 21D, 21E, 21G, 21H and 21I.

Also, as shown in FIGS. 21J and 21K, the integration time period signal $\phi_B$ and the reset signal $\phi_R$ are supplied to the integrator circuit 6. As a result, as shown in FIG. 21L, the integration output signal $S_{OUT}$ is obtained.

Thus, the bolometer-type infrared detecting apparatus of FIG. 20 with the latch circuit 7 operates in the same way as the bolometer-type infrared detecting apparatus of FIG. 15 without the latch circuit 7.

Figure 22:
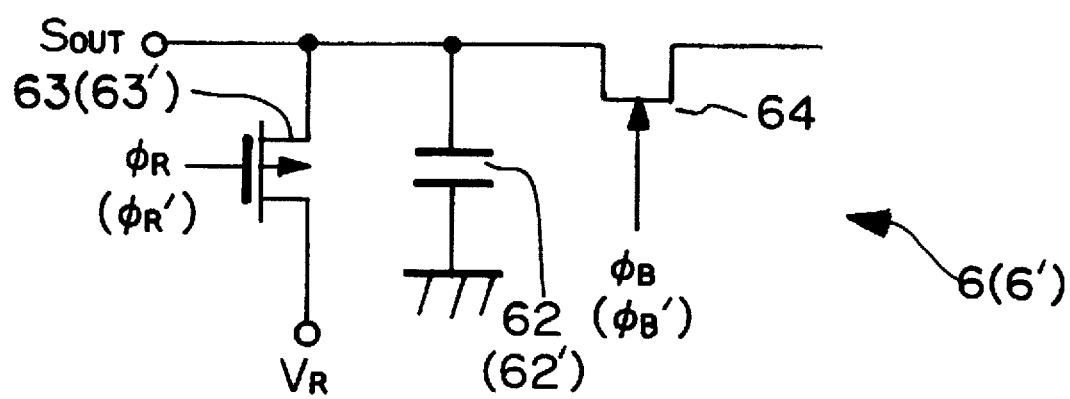
FIG. 22 is a circuit diagram illustrating a modification of the integrator circuit of FIGS. 3, 6, 7, 12, 14, 15, 17, and 20.

In FIG. 22, which is a modification of the integrator circuit of FIGS. 3, 6, 7, 12, 14, 15, 17 and 20, a junction type FET 64 is provided instead of the bipolar transistor 61 (61'). In this case, the integrator circuit with the junction type FET 64 operates in the same way as the integrator circuit with the bipolar transistor 61 (61').

Figure 23:
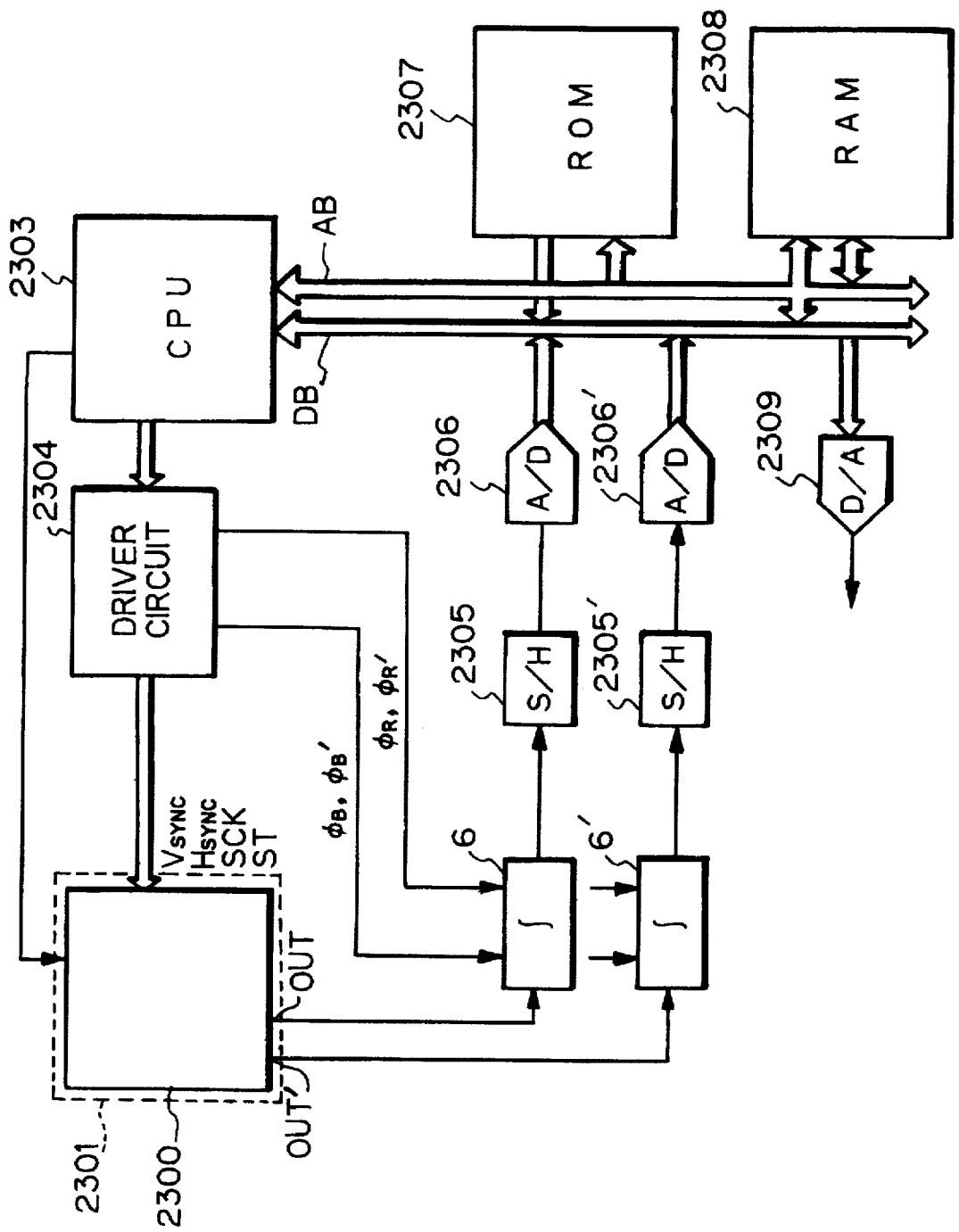
FIG. 23 is a block circuit diagram illustrating an infrared processing system including the bolmeter-type infrared detecting appratus of FIG. 3, 6, 7, 12, 14, 15, 17, or 20.

In FIG. 23, which is a block circuit diagram illustrating an infrared processing system including the bolometer-type infrared detecting apparatus of FIG. 3, 6, 7, 12, 14, 15, 17 or 20, an infrared detecting device 2300 formed by the bolometer-type detecting apparatus of FIG. 3, 6, 7, 12, 14, 15, 17 or 20 except for the integrator circuit 6 (6') is provided on a Peltier element 2301 to nhereby maintain the temperature of the infrared device at a definite temperature. The peltier element 2301 is controlled directly by a central processing unit (CPU) 2303. Also, the CPU 2303 controls a driver circuit 2304 to generate various control signals such as the vertical synchronization signal $V_{SYNC}$, the horizontal synchronization $H_{SYNC}$, the synchronization clock signal SCK and the strobe signal ST and transmit them to the infrared detecting device 2300. In this case, if the infrared detecting device 2300 is formed by the apparatus as illustrated in FIG. 3, 6 or 15, the strobe signal ST is not supplied thereto. Also, if the detecting device 2300 is formed by the apparatus as illustrated in FIG. 15, 17 or 20, the vertical synchronization signal $V_{SYNC}$ is not supplied thereto.

The output terminals OUT and OUT' of the infrared detecting device 2300 are cormected to the integrator circuits 6 and 6', respectively, which receive the integration time period signals $\phi_B$ and $\phi_b'$ and the reset signals $\phi_R$ and $\phi_R'$ from the driver circuit 2304. The outputs of the integrator circuits 6 and 6' are connected to sample/hold (S/H) circuits 2305 and 2305', respectively, which are also connected to analog/digital converters 2306 and 2306', respectively. In this case, if the infrared detecting device 2300 is formed by the apparatus as illustrated in FIG. 3, 6, 12, 15 or 20, the integrator circuit 6', the sample/hold circuit 2305' and the A/D converter 2306' are not provided.

Also, in FIG. 23, reference numeral 2307 designates a read-only memory (ROM) for storing programs and constants, and 2308 designates a random access memory (RAM) for storirug data of pixels. Further, reference numeral 2309 designates a digital/analog (D/A) converter 2309 for generating a National Television System Committee (NTSC) signal or the like.

The CPU 2303, the A/D converters 2306 and 2306', the ROM 2307, the RAM 2308 and the D/A converter 2309 are mutually connected by a data bus DB and an address bus AB.

Note that the integrator circuits 6 and 6' can be introduced into the infrared detecting device 2300. In other words, the infrared detecting device 2300 and the integrator circuits 6 and 6' can be formed in a single semiconductor chip.

The structure of one pixel such as $P_{ij}$ of the bolometer-type infrared detecting apparatus of FIGS. 3, 6, 7, 12, and 14 is explained next with reference to FIG. 24 which is a cross-sectional view and FIGS. 25A and 25B.

Figure 24:
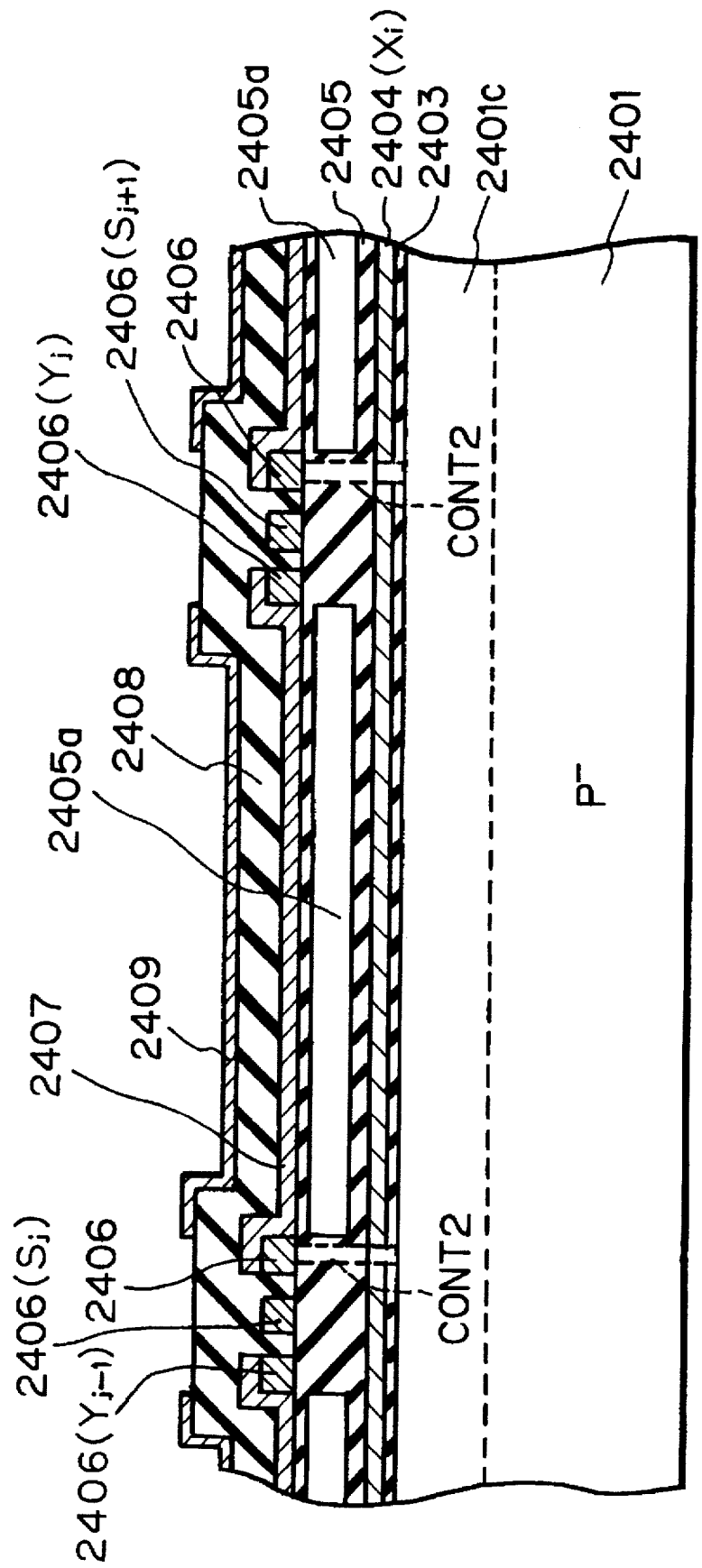
FIG. 24 is a cross-sectional view illustrating an example of a pixel of the bolemeter-type infrared detecting apparatus of FIG. 3, 6, 7, 12 or 14.
Figure 25A:
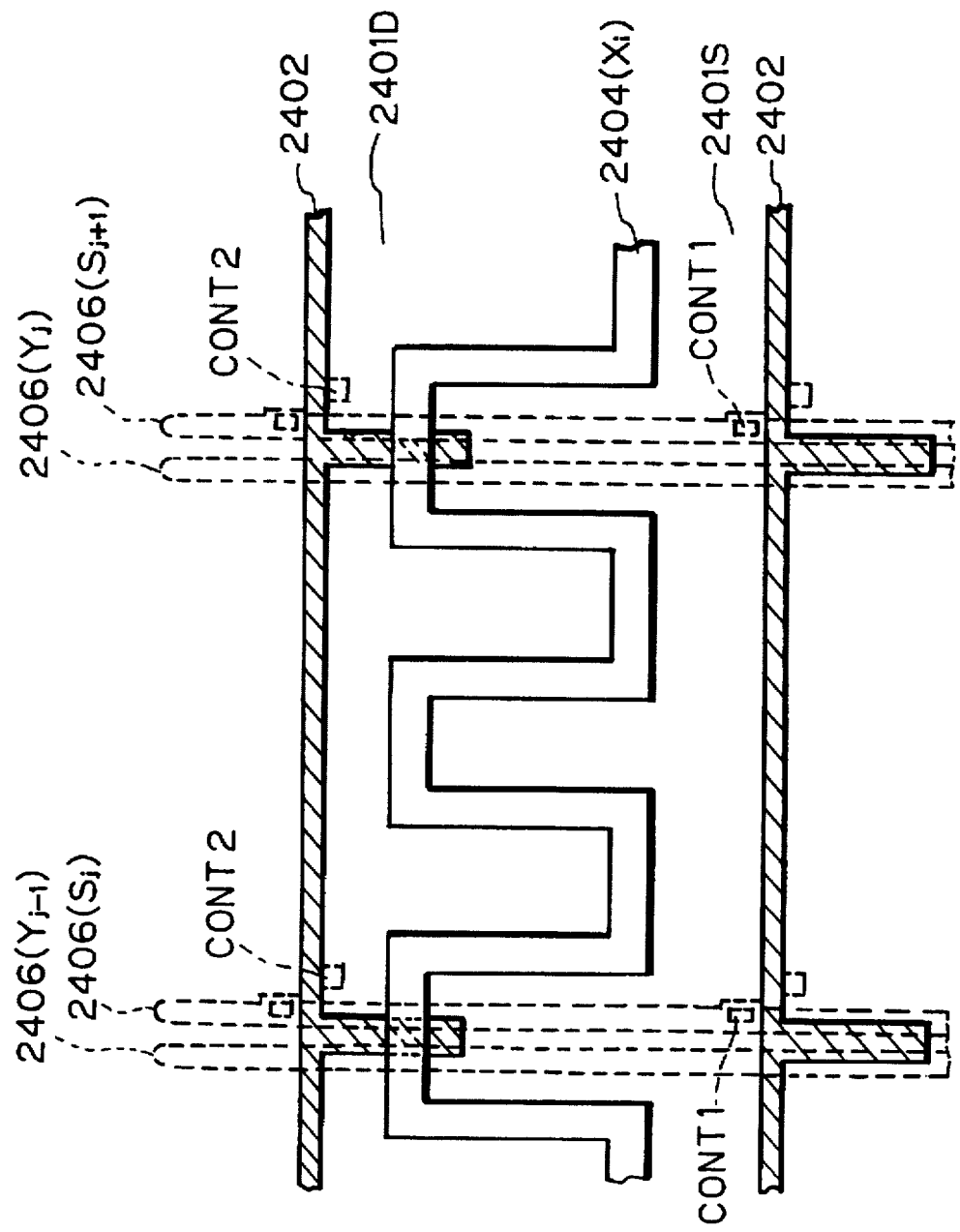

First, referring to FIGS. 24 and 25A, a thick silicon oxide layer 2402 is formed on a P-type monocrystalline silicon substrate 2401, to partition each of the pixels. Also, a thin silicon oxide layer 2403 is formed thereon, and a polycrystalline silicon layer 2404 is formed and patterned to form the signal lines $X_1$, $X_2$, ..., $X_m$.

Also, within the silicon substrate 2401 are N-type impurity diffusion regions 2401S and 2401D with a mask of the thick silicon oxide layer 2402 and the polycrystalline silicon layer 2404. The impurity diffusion regions 2401S and 2401D serve as a source region and a drain region, respectively. In this case, a region within the silicon substrate 2401 beneath the polycrystalline silicon layer 2404 serves as a channel region 2401C. Thus, the N-channel MOS transistor Q of the pixel $P_{ij}$ is constructed by the gate electrode (the polycrystalline silicon layer 2404), the source region 2401S and the drain region 2401D. In this case, the gate electrode is of a folded-shape or zigzag-shape to increase the width of the gate electrode, thus increasing a current flowing therethrough.

Also, in FIG. 24, a thick silicon oxide layer 2405 is formed on the surface and a cavity 2405a is formed therein. This cavity 2405a is formed by filling polycrystalline silicon into the thick silicon oxide layer 2405 and thereafter etching the polycrystalline silicon. This cavity 2405a improves the thermal isolation characteristics of the bolometer.

Referring to FIGS. 24 and 25B, aluminum or its alloy is formed thereon and patterned to form an aluminium layer 2406. The aluminum layer 2406 serves as the source lines $S_j$ and $S_{j+1}$, and the signal line $Y_j$. In this case, the source lines $S_j$ and $S_{j+1}$ are connected via contact holes CONT1 to the source region 2401S. Also, the aluminum layer 2406 serves as contacts to the drain region 2401D via contact holes CONT2.

Also, referring to FIGS. 24 and 25B, a titanium layer 2407 serving as the bolometer R, a silicon oxide layer 2408 and a titanium nitride layer 2409 are formed. The layers 2407, 2408 and 2409 also serve as an infrared absorption layer or so-called diaphragm which is thermally isolated by a slit 2410 in addition to the cavity 2405a. That is, infrared radiation reflected from the titanium layer 2407 is absorped due to the interference effect by the titanium nitride layer 2409. In order to effectively exhibit this interference effect, the thickness of the silicon oxide layer 2408 should be $\lambda/(4n)$, where $\lambda$ is a wavelength of the infrared radiation and n is a refractive index of the silicon oxide layer 2408. For example, the titanium nitride layer 2409 is hundreds of Å. Also, in order to effectively reflect infrared radiation, the titanium layer 2407 is tightly folded.

In the pixel as illustrated in FIGS. 24, 25A and 25B, when infrared radiation are incident to the thermally-isolated diaphragm, the diaphragm is heated, so that the resistance of the bolometer R, i.e., the titanium layer 2407 is changed. In this case, since the temperature of the pedestal (foot) portions of the bolometer is hardly changed, the resistance thereof is hardly changed. Also, the bolometer 2407 is of a folded-shape as illustrated in FIG. 25B, so that the bolometer 2407 is substantially long with respect to the reception of infrared radiation. As a result, the resistance of the substantially long bolometer R is larger than the resistance of the pedestal portions thereof, the ON resistance of the MOS transistor Q, the resistance of the wiring between the ground terminal GND and the output terminal OUT, or the resistance of the transfer gate such as $TG_j$.

Figure 26:
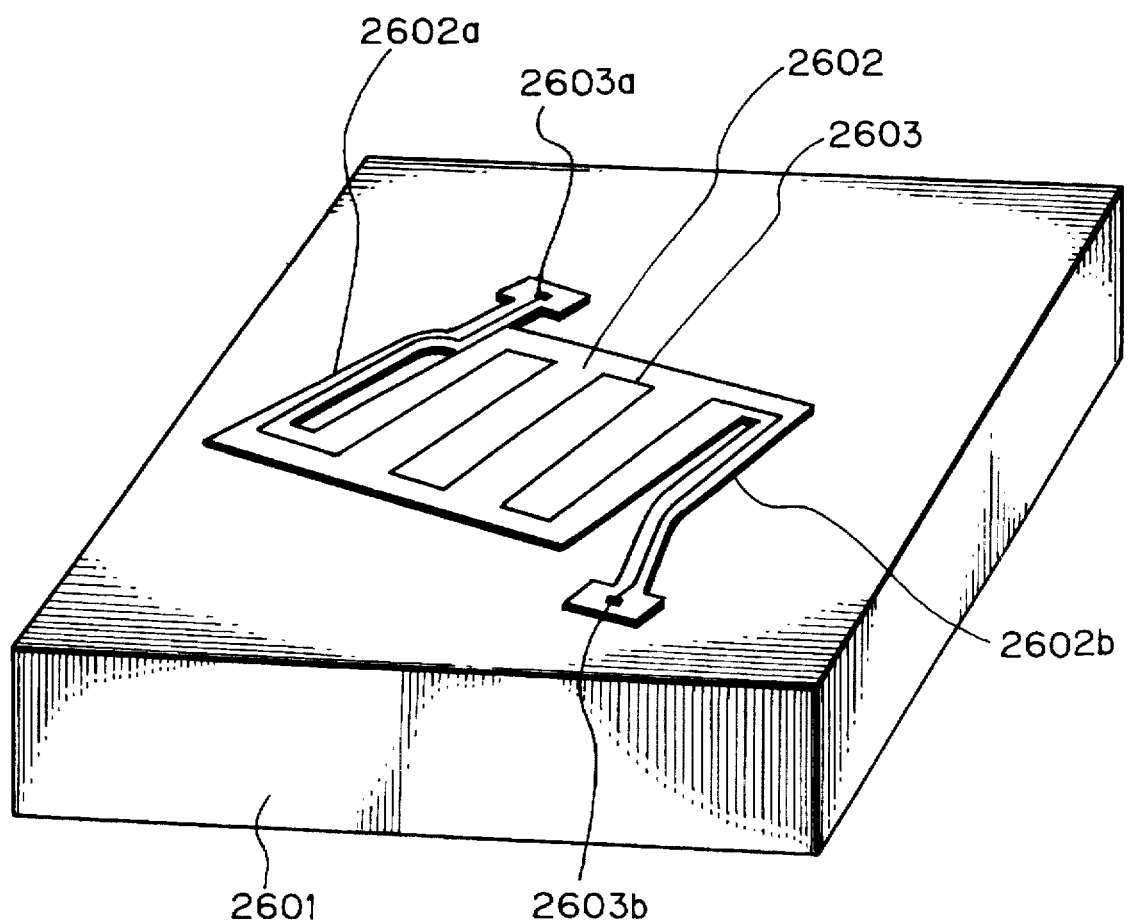
FIG. 26 is a cross-sectional view illustrating another example of a pixel of the bolometer-type infrared detecting apparatus of FIG. 3, 6, 7, 12 or 14.

In FIG. 26, which is a modification of the diaphragm of FIGS. 24 and FIGS. 25A and 25B, the MOS transistor Q of each pixel is formed in a semiconductor substrate 2601 in the same way as in FIGS. 24, 25A and 25B. Also a diaphragm 2602 is made of silicon nitride or silicon oxide and has two feet 2602a and 2602b which are in contact to the semiconductor substrate 2601. Further, a titanium bolometer 2603 is tightly folded on the diaphragm 2602, and is electrically connected to the semiconductor substrate 2601. Thus, the diaphragm 2602 associated with the titanium bolometer 2603 is placed in a floating state. Also, since the titanium bolometer 2603 is substantially long due to the tightly-folded shape, the resistance of the bolometer R is larger than the resistance of the pedestal portions thereof, the ON resistance of the MOS transister Q, the resistance of the wiring between the ground terminal GND and the output terminal OUT, or the resistance of the transfer gate such as $TG_j$.

According to the inventors' experiment, when an area of each pixel is 50 μm×50 μm, and an object has a difference in temperature of 1 deg, the increase in temperature of the diaphragm as illustrated in FIGS. 24, 25A and 25B or FIG. 26 is 0.002 deg. Therefore, if a bias current I is about 1 mA, the resistance of the titanium bolometer is 10 KΩ, and the temperature coefficient of the titanium bolometer is 0.5%/deg, a signal voltage $V_S$ is represented by $$V_S = I \cdot \alpha \cdot \Delta T = 100 \mu V$$

on the other hand, considering only Johnson noise, a noise voltage $V_N$ is represented by $$V_N = \sqrt{4kT \cdot R/(2T_s)}$$

where k is a Boltzmann's constant; and $T_s$ is an integration time period. Then, if $T_s = 2$ μs, $$V_N = 6.4 \mu V$$

Thus, a temperature resolution NETD is $$NETD = V_N/V_S = 0.06$$

In the above-described embodiments as illustrated in FIGS. 7, 12, 14, 17 and 20, two output terminals OUT and OUT' are provided; however, three or more output terminals can be provided. For example, if three output terminals are provided In the apparatus of FIG. 7, 12 or 14, the signal lines $Y_1, Y_4, \ldots$ are connected to a first one, the signal lines $Y_2, Y_5, \ldots$ are connected to a second one, and the signal lines $Y_3, Y_6, \ldots$ are connected to a third one. Also, in this case, in order to increase the integration time period, the horizontal synchronization signal $H_{SYNC}$ is sufficiently long to cover three synchronization clock signals SCK.

Also, the pixel structure as illustrated in FIGS. 24, 25A, 25B, and 26 can be applied to a one-dimensional bolometer-type infrared detecting apparatus as illustrated in FIG. 15, 17, or 20. In this case, the polycrystalline silicon layer 2404 serves as the signal line $Y_j$.

As explained hereinbefore, according to the present invention, since the 1/f noise can be reduced, and the power consumption can be reduced.

We claim:

1. A bolometer-type infrared detecting apparatus comprising:

a power supply terminal;

an output terminal;

a MOS transistor having a source connected to said power supply terminal, a drain and a gate;

a bolometer, operatively connected between said drain and said output terminal, for converting incident infrared into an electrical signal; and driving means for driving said MOS transistor.

2. An apparatus as set forth in claim 1, wherein said bolometer is made of titanium.

3. An apparatus as set forth in claim 2, wherein said bolometer consists of titanium or an alloy of titanium.

4. An apparatus as set forth in claim 1, wherein said bolometer is thermally isolated from said power supply terminal, said output terminal, said MOS transistor and said driving means.

5. An apparatus as set forth in claim 1, further comprising:
a semiconductor substrate having said source and said drain of said MOS transistor therein; and
an insulating layer formed over said semiconductor substrate and having a cavity therein,
said bolometer being formed on said insulating layer above said cavity thereof.

6. An apparatus as set forth in claim 5, wherein said bolometer is of a folded structure on said insulating layer.

7. An apparatus as set forth in claim 5, further comprising a conductive layer over said semiconductor substrate between said source and said drain of said MOS transistor,
said conductive layer serving as said gate of said MOS transistor.

8. An apparatus as set forth in claim 7, wherein said conductive layer is of a folded structure.

9. An apparatus as set forth in claim 7, wherein said conductive layer is made of polycrystalline silicon.

10. An apparatus as set forth in claim 1, further comprising:
a semiconductor substrate having said source and said drain of said MOS transistor; and
a diaphragm formed in a floating state from said semiconductor substrate;
said bolometer being formed on said diaphragm.

11. An apparatus as set forth in claim 10, wherein said bolometer is of a folded structure on said diaphragm.

12. An apparatus as set forth in claim 10, further comprising a conductive layer over said semiconductor substrate between said source and said drain of said MOS transistor,
said conductive layer serving as said gate of said first MOS transistor.

13. An apparatus as set forth in claim 12, wherein said conductive layer is of a folded structure.

14. An apparatus as set forth in claim 12, wherein said conductive layer is made of polycrystalline silicon.

15. An apparatus as set forth in claim 1, further comprising an integrator circuit connected to said output terminal.

16. An apparatus as set forth in claim 15, wherein said integrator circuit comprises:
a bipolar transistor having an emitter connected to said output terminal, a base for receiving an integration time period signal, and a collector;
a capacitor connected to said collector; and
a reset transistor, connected to said capacitor and being turned ON by a reset signal.

17. An apparatus as set forth in claim 15, wherein said integrator circuit comprises:
a junction type FET having a source connected to said output terminal, a gate for receiving an integration time period signal, and a drain;
a capacitor connected to said drain of said junction type FET; and
a reset transistor, connected to said capacitor and being turned ON by a reset signal.

18. A two-dimensional bolometer-type infrared detecting apparatus comprising:
a power supply terminal;
a plurality of first signal lines arranged along a first direction;
a plurality of second signal lines arranged along a second direction approximately perpendicular to said first direction;
a plurality of source lines arranged along said second direction and connected to said power supply terminal; and
a plurality of pixels,
each of said pixels comprising:
a first MOS transistor having a source connected to one of said source lines, a gate connected to one of said first signal lines, and a drain; and
a bolometer connected between said drain of said first MOS transistor and one of said second signal lines.

19. An apparatus as set forth in claim 18, further comprising:
an output terminal; and
a plurality of transfer gates connected between said second signal lines and said output terminal.

20. An apparatus as set forth in claim 19, further comprising:
a first selecting means, connected to said first signal lines, for selecting one of said first signal lines and applying a first voltage to a selected one of said first signal lines; and
second selecting means, connected to said transfer gates, for selecting one of said transfer gates so that one of said second signal lines is electrically connected to said output terminal.

21. An apparatus as set forth in claim 20, wherein a timing of said second selecting means is delayed from a timing of said first selecting means.

22. An apparatus as set forth in claim 19, wherein an electrical path via any of said pixels is approximately diagonal within said pixels.

23. An apparatus as set forth in claim 22, wherein the width of said second signal lines is approximately the same as that of said source lines, and the width of a conductor connected to said power supply terminal is approximately the same as that of a conductor connected to said output terminal.

24. An apparatus as set forth in claim 18, further comprising:
an output terminal connected to said second signal lines;
a plurality of second MOS transistors connected between said source lines and said power supply line.

25. An apparatus as set forth in claim 24, further comprising:
first selecting means, connected to said first signal lines, for selecting one of said first signal lines and applying a first voltage to a selected one of said first signal lines; and
second selecting means, connected to said second MOS transistors, for selecting one of said second MOS transistors so that one of said source lines is electrically connected to said power supply line.

26. An apparatus as set forth in claim 25, wherein a timing of said second selecting means is delayed from a timing of said first selecting means.

27. An apparatus as set forth in claim 25, wherein said power supply terminal and said output terminal are diagonally located in relation to each other with respect to said apparatus.

28. An apparatus as set forth in claim 18, further comprising:
a plurality of output terminals; and
a plurality of groups of transfer gates each group connected between one group of said second signal lines and one of said output terminals.

29. An apparatus as set forth in claim 28, further comprising:

first selecting means, connected to said first signal lines, for selecting one of said first signal lines and applying a first voltage to a selected one of said first signal lines; and second selecting means, connected to said transfer gates, for selecting one of each group of said transfer gates so that one of each group of said second signal lines is electrically connected to one of said output terminals.

30. An apparatus as set forth in claim 29, wherein a timing of said second selecting means is delayed from a timing of said first selecting means.

31. An apparatus as set forth in claim 28, wherein an electrical path via any of pixels is approximately diagonal within said pixels.

32. An apparatus as set forth in claim 31, wherein the width of said second signal lines is approximately the same as that of said source lines, and the width of a conductor connected to said power supply terminal is approximately the same as that of a conductor connected to said output terminal.

33. An apparatus as set forth in claim 32, further comprising:

first selecting means, connected to said first signal lines, for selecting one of said first signal lines and applying a first voltage to a selected one of said first signal lines; and second selecting means, connected to said second MOS transistors, for selecting one of each group of said second MOS transistors so that one of each group of said source lines is electrically connected to said power supply line.

34. An apparatus as set forth in claim 33, wherein a timing of said second selecting means is delayed from a timing of said first selecting means.

35. An apparatus as set forth in claim 33, wherein said power supply terminal and said output terminal are diagonally located in relation to each other with respect to said apparatus.

36. An apparatus as set forth in claim 18, further comprising:

a plurality of output terminals each group connected to one group of said second signal lines; and a plurality of second MOS transistors connected between said source lines and said power supply line.

37. An apparatus as set forth in claim 18, wherein said bolometer is made of titanium.

38. An apparatus as set forth in claim 37, wherein said bolometer consists of titanium or an alloy of titanium.

39. An apparatus as set forth in claim 18, wherein said first signal lines are made of polycrystalline silicon, and said second signal lines and said source lines are made of aluminum.

40. A one-dimensional bolometer-type infrared detecting apparatus comprising:

a power supply terminal;

an output terminal;

a first signal line connected to said output terminal and arranged along a first direction;

a plurality of second signal lines arranged along a second direction approximately perpendicular to said first direction;

a source terminal connected to said power supply line and arranged along said first direction; and a plurality of pixels, each of said pixels comprising:

a MOS transistor having a source connected to said source line, a gate connected to one of said second signal lines, and a drain; and a bolometer connected between said drain of said MOS transistor and said first signal line.

41. An apparatus as set forth in claim 40, further comprising selecting means, connected to said second signal lines, for selecting one of said second signal lines and applying a voltage to a selected one of said second signal lines.

42. An apparatus as set forth in claim 40, wherein said bolometer is made of titanium.

43. An apparatus as set forth in claim 42, wherein said bolometer consists of titanium or an alloy of titanium.

44. A one-dimensional bolometer-type infrared detecting apparatus comprising:

a power supply terminal;

a plurality of output terminals;

a plurality of first signal lines each connected to one of said output terminals and arranged along a first direction;

a plurality of second signal lines arranged along a second direction approximately perpendicular to aid first direction;

a source line connected to said power supply line and arranged along said first direction; and a plurality of pixels, each of said pixels comprising:

a MOS transistor having a source connected to said source line, a gate connected to one of said second signal lines, and a drain; and a bolometer connected between said drain of said MOS transistor and one of said first signal lines.

45. An apparatus as set forth in claim 44, further comprising selecting means, connected to said second signal lines, for selecting one of said second signal lines and applying a voltage to a selected one of said second signal lines.

46. An apparatus as set forth in claim 44, wherein said bolometer is made of titanium.

47. An apparatus as set forth in claim 46, wherein said bolometer consists of titanium or an alloy of titanium.

48. A two-dimensional bolometer-type infrared detecting apparatus comprising:

a power supply terminal;

an output terminal arranged diagonally with respect to said power supply terminal;

a plurality of first signal lines arranged along a first direction;

a plurality of second signal lines arranged along a second direction approximately perpendicular to said first direction;

a plurality of source lines connected to said power supply terminal and arranged along said second direction;

a plurality of pixels, each including a MOS transistor having a source connected to one of said source lines, a gate connected to one of said first signal lines, and a titanium bolometer connected between a drain of said MOS transistor and one of said second signal lines;

a plurality of transfer gates connected between said second signal lines and said output terminal;

vertical shift register means operatively connected to said first signal lines, for receiving a vertical synchronization signal and a first horizontal synchronization signal to apply a first voltage having a time period of said first horizontal synchronization signal successively to said first signal lanes in response to said vertical synchronization signals; and horizontal shift register means, operatively connected to said transfer gates, for receiving a second horizontal synchronization signal and a synchronization clock signal to apply a second voltage having a time period of said synchronization clock signal successively to said transfer gates in response to said second horizontal synchronization signal, said second horizontal synchronization signal being a delayed signal of said first horizontal synchronization signal.

49. A two-dimensional bolometer-type infrared detecting apparatus comprising:

a power supply terminal;

an output terminal arranged diagonally with respect to said power supply terminal;

a plurality of first signal lines arranged along a first direction;

a plurality of second signal lines connected to said output terminal and arranged along a second direction approximately perpendicular to said first direction;

a plurality of source lines arranged along said second direction;

a plurality of pixels, each including a first MOS transistor having a source connected to one of said source lines, a gate connected to one of said first signal lines, and a titanium bolometer connected between a drain of said first MOS transistor and one of said second signal lines;

a plurality of second MOS transistors connected between said source lines and said power supply line;

vertical shift register means, operatively connected to said first signal lines, for receiving a vertical synchronization signal and a first horizontal synchronization signal to apply a first voltage having a time period of said first horizontal synchronization signal successively to said first signal lines in response to said vertical synchronization signals; and horizontal shift register means, operatively connected to said second MOS transistors, for for receiving a second horizontal synchronization signal and a synchronization clock signal to apply a second voltage having a time period of said synchronization clock signal successively to said second MOS transistors in response to said second horizontal synchronization signal, said second horizontal synchronization signal being a delayed signal of said first horizontal synchronization signal.

50. A two-dimensional bolometer-type infrared detecting apparatus comprising:

a power supply terminal;

two output terminals arranged diagonally with respect to said power supply terminal;

a plurality of first signal lines arranged along a first direction;

a plurality of second signal lines arranged along a second direction approximately perpendicular to said first direction;

a plurality of source lines connected to said power supply terminal and arranged along said second direction;

a plurality of pixels, each including a MOS transistor having a source connected to one of said source lines, a gate connected to one of said first signal lines, and a titanium bolometer connected between a drain of said MOS transistor and one of said second signal lines;

two groups of transfer gates each groups connected between one group of said second signal lines and one of said output terminals;

vertical shift register means, operatively connected to said first signal lines, for receiving a vertical synchronization signal and a first horizontal synchronization signal to apply a first voltage having a time period of said first horizontal synchronization signal successively to said first signal lines in response to said vertical synchronization signals;

a horizontal shift register means for receiving a second horizontal synchronization signal and a synchronization clock signal to generate horizontal signals having a time period twice that of said synchronization clock signal successively in response to said second horizontal synchronization signal, said second horizontal synchronization signal being a delayed signal of said first horizontal synchronization signal; and latch means, connected between said transfer gates and said horizontal shift register means, for latching said horizontal signals in response to a strobe signal having half the frequency of said synchronization clock signal, to apply a second voltage having a time period twice that of said synchronization clock signal successively to each group of said transfer gates.

51. An apparatus as set forth in claim 50, wherein said latch means is caused to be in a through state, to apply said horizontal signals to said transfer gates.

52. A two-dimensional bolometer-type infrared detecting apparatus comprising:

a power supply terminal;

two output terminals arranged diagonally with respect to said power supply terminal;

a plurality of first signal lines arranged along a first direction;

two groups of second signal lines arranged along a second direction approximately perpendicular to said first direction each group of said second signal lines being connected to one of said output terminals;

a plurality of source lines arranged along said second direction;

a plurality of pixels, each including a first MOS transistor having a source connected to one of said source lines, a gate connected to one of said first signal lines, and a titanium bolometer connected between a drain of said first MOS transistor and one of said second signal lines;

a plurality of second MOS transistors connected between said source lines and said power supply line;

vertical shift register means operatively connected to said first signal lines, for receiving a vertical synchronization signal and a first horizontal synchronization signal to apply a first voltage having a time period of said first horizontal synchronization signal successively to said first signal lines in response to said vertical synchronization signals;

horizontal shift register means for receiving a second horizontal synchronization signal and a synchronization clock signal to generate horizontal signals having a time period twice that of said synchronization clock signal successively in response to said second horizontal synchronization signal, said second horizontal synchronization signal being a delayed signal of said first horizontal synchronization signal; and latch means, connected between said second MOS transistors and said horizontal shift register means, for latching said horizontal signals in response to a strobe signal having half of the frequency of said synchronization clock signal, to apply a second voltage having a time period twice that of said synchronization clock signal successively to said second MOS transistors.

53. A one-dimensional bolometer-type infrared detecting apparatus comprising:

a power supply terminal;

an output terminal;

a first signal line connected to said output terminal and arranged along a first direction;

a plurality of second signal lines arranged along a second direction approximately perpendicular to said first direction;

a source line connected to said power supply line and arranged along said first direction;

a plurality of pixels, each including a MOS transistor having a source connected to said source line, a gate connected to one of said second signal lines, and a titanium bolometer connected between a drain of said transistor and said first signal line;

horizontal shift register means, operatively connected to said second signal lines, for receiving a horizontal synchronization signal and a synchronization clock signal to apply a voltage having a time period of said synchronization lock signal successively to said second signal lines in response to said horizontal synchronization signal.

54. A one-dimensional bolometer-type infrared detecting apparatus comprising:

a power supply terminal;

two output terminals;

two first signal lines each connected to one of said output terminals, said first signal lines being arranged along a first direction;

a plurality of second signal lines arranged along a second direction approximately perpendicular to said first direction;

a source line connected to said power supply line and arranged along said first direction;

a plurality of pixels, each including a MOS transistor having a source connected to said source line, a gate connected to one of said second signal lines, and a titanium bolometer connected between a drain of said MOS transistor and said first signal line;

a horizontal shift register for receiving a horizontal synchronization signal and a synchronization clock signal to generate horizontal signals having a time period twice that of said synchronization lock signal in response to said horizontal synchronization signal; and latch means, connected between said second signal lines and said horizontal shift register, for latching said horizontal signals in response to a strobe signal having half of the frequency of said synchronization clock signal, to apply a second voltage having a time period twice that of said synchronization clock signal successively to said second signal lines.

55. An infrared detecting apparatus comprising a bolometer consisting of titanium or an alloy of titanium.

* * * * *